(12) United States Patent
Kurrasch

(10) Patent No.: US 6,754,854 B2
(45) Date of Patent: Jun. 22, 2004

(54) SYSTEM AND METHOD FOR EVENT MONITORING AND ERROR DETECTION

(75) Inventor: Peter Kurrasch, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 631 days.

(21) Appl. No.: 09/873,489

(22) Filed: Jun. 4, 2001

(65) Prior Publication Data

US 2002/0184568 A1 Dec. 5, 2002

(51) Int. Cl.[7] .................. G06F 11/00; G06F 15/173; G06F 15/00
(52) U.S. Cl. .................. 714/47; 714/4; 709/224; 702/186
(58) Field of Search .................. 714/4, 47; 709/224; 702/186

(56) References Cited

U.S. PATENT DOCUMENTS

| | | | | |
|---|---|---|---|---|
| 5,581,482 A | * | 12/1996 | Wiedenman et al. | ....... 702/186 |
| 5,828,851 A | | 10/1998 | Nixon et al. | ................. 395/285 |
| 5,995,916 A | | 11/1999 | Nixon et al. | ................. 702/182 |
| 6,351,724 B1 | * | 2/2002 | Klassen et al. | ............. 702/186 |
| 6,453,268 B1 | * | 9/2002 | Carney et al. | .............. 702/186 |
| 6,564,170 B2 | * | 5/2003 | Halabieh | ..................... 702/181 |

\* cited by examiner

*Primary Examiner*—Robert Beausoliel
*Assistant Examiner*—Emerson Puente

(57) ABSTRACT

An event monitor includes an event counter for counting one or more preselected events detected by an event counter. The events are counted for successive time periods and an indication of system stability is calculated to detect possible error conditions. The indication of system stability is calculated by taking a nonweighted or weighted sum of the total number of events counted in the current time period, the total number of events counted in all time periods monitored, and the difference between the total number of events counted in the current time period and the total number of events counted in the preceding time period. In this manner, the event monitor is able to identify possible error conditions more quickly than systems using rate thresholding so that remedial action may be initiated sooner. In a further aspect, system stability is further assessed by counting the number of time periods in which there is an indicium of stability, and is thus able to quickly identify a potential error condition that has stabilized and for which remedial action is not necessary. In further aspects, methods for event monitoring and error detection are provided.

56 Claims, 14 Drawing Sheets

SYSTEM AND METHOD FOR EVENT MONITORING AND ERROR DETECTION

FIELD OF THE INVENTION

The present invention relates generally to information handling systems and, more particularly, to a system and method for event monitoring and the detection of error conditions in such systems. It finds particular application in monitoring network communications between interconnected information handling systems, as well as the transfer of data within an information handling system.

BACKGROUND OF THE INVENTION

Networks of interconnected information handling systems, such as computer systems, telecommunication equipment, and related devices, are widely used to provide increased computing power, sharing of resources, and communication between users. In communicating over a network, there are a number of errors or faults that can occur, including corruption of data, malfunctioning of a network device, faults in a data link, traffic overload on parts of the network, and so forth.

To cope with such errors, network management systems conventionally include an error monitoring function. Because not all errors will require remedial action, it is desirable to distinguish between intermittent or transient error conditions not requiring remedial action and real error conditions for which some remedial is, or is likely to be, necessary. To make this distinction, the prior art monitoring systems typically monitor the error rate and, for example, generate a warning when the error rate increases above some preselected rising threshold level and terminate the warning when the error rate falls below some preselected falling threshold level.

One shortfall of the error rate thresholding scheme of the prior art is that it does not account for trend and history. It would be desirable to examine the trend in the event stream in order to detect a potential error condition faster. Likewise, it would be desirable to examine the history of the event stream in order to determine more quickly when a potential error condition has stabilized and is no longer of concern.

One control scheme that takes trend and history into account is the proportional-integral-derivative (PID) controller. PID controllers are widely used in industry and are generally implemented as hardware devices, especially as electrical circuits using resistors, inductors, and capacitors. Although such circuits could be modeled in software on a computer, the complexity of the math required to model a PID controller would render such software models large and, thus, costly to implement. Such a software model would be particularly difficult to implement in an embedded system or controller or other communication or information handling environments where program storage space and/or processing power are limited. Also, a software model does not provide a real-time quality since the mathematical calculations may require a number of seconds or minutes to complete. In a real-time application, such as in telecommunications equipment, such a wait is undesirable and, in some cases, unacceptable.

For the forgoing reasons, there is a need for an improved event monitoring system and method that can detect potential error conditions based on event trend and history. Additionally, there is a need for an event monitoring system and method that can rapidly determine when a potential error condition has stabilized and is no longer of concern.

It is to be understood that the following description of the invention is exemplary and explanatory only, and is not restrictive of the invention as claimed. The accompanying drawings, which are incorporated in and constitute a part of the specification, illustrate presently preferred embodiments of the invention, and, together with the description of the preferred embodiments given below, serve to explain the principles of the invention.

BRIEF DESCRIPTION OF THE DRAWINGS

The description of the invention may be best understood when read in reference to the accompanying drawings wherein.

DESCRIPTION OF THE PREFERRED EMBODIMENTS

In a first aspect, the present invention addresses the above mentioned problems and others by monitoring for one or more prespecified events and employing a simplified PID algorithm to detect a condition potentially requiring some further action, such as a potential error condition. Such conditions can be identified more quickly and, for example, brought to the attention of a user, such as a system administrator, network administrator, system operator, and the like. The user can then take some corrective or remedial action. In a second aspect, the present invention employs a simplified PID algorithm to further determine when a monitored system has stabilized. In this manner, a user can be informed quickly that the system is, or appears to be, stable and any previous messages or warnings can be terminated or withdrawn.

Figure 1:
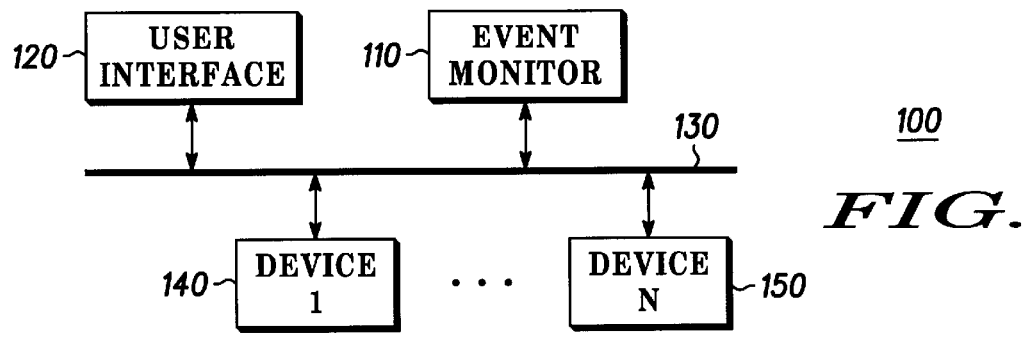
FIG. 1 is a block diagram illustrating a data link employing the event monitor of the present invention.

FIG. 1 is communication system 100 comprising two or more communicatively linked devices 140, . . . , up to N devices 150. The devices 140–150 are linked by a data link 130, which may be a wired, wireless, and interconnections thereof. Wireless links include, for example, radio frequency (RF) links, microwave links, infrared links, optical links, optical fiber links, ultrasound links, and so forth. An event monitor 110 monitors one or more communication or other signals for the occurrence of one or more predetermined or prespecified events. The types of events to be monitored are preferably user selectable. Events to be monitored and detected include, but are not limited to, device functional behavior, parity and system errors, bad parity signaling, network protocol violations, bus protocol violations, network arbitration errors, bus arbitration errors, data corruption, data miscompare errors, bad data packets, synchronization errors, network traffic events, network collisions, data flow control errors, transmission control errors, path control errors, data link control errors, physical signaling errors, data link protocol errors, excessive noise or interference, and the like. Such events are detected by an appropriate sensor, processing circuitry, or the like and reported to the event monitor 110. Such a detector may be integrated or interfaced directly to the event monitor 110, or the events may be reported to the event monitor 110 over a data link, such as data link 130.

Events to be monitored can also include events that are, in and of themselves, not indicative of an error condition, but that may nevertheless indicate an error condition in light of the rate, history, and trend information of their occurrences, as calculated in accordance with this teaching.

In preferred embodiments, the event monitor of the present invention is implemented in an embedded controller, embedded software system, or other specialized computer system. Such systems are typically used to control vehicles, appliances, and other devices. The event monitor is advantageously implemented in an embedded system because the event monitor of the present invention is computationally simple and such systems are typically memory and computationally limited.

Thus, the event monitor can be implemented for any stream monitoring application, including voice or other data transmission streams, audio and/or video data streams, video game and computer application environments, controller and sensor data streams in vehicles such as automobiles and other overland vehicles, watercraft, aircraft, spacecraft, and the like, such as engine controllers, suspension controllers, or other controllers, and sensor data streams for vehicle instrumentation and the like, appliances, medical devices, building control, industrial and manufacturing plant equipment, process control, and so forth. The event monitored can also be the output of another event monitor of the present invention. For example, two or more event monitors can be cascaded or networked so that the output of one monitor serves as the input of another.

When an error condition is indicated by the event monitor 110, an error warning is preferably generated. Preferably, the warning is in the form of output to a user, e.g., via a user interface 120. The user can then initiate some remedial action, such as making or initiating a service call, saving data to memory, taking a link out of service, and so forth. In addition to user initiated actions, corrective or remedial actions can also be taken automatically under preprogrammed control.

User interface 120 is optionally provided for user input and control and for information display. The user interface 120 can include, for example, a display, keyboard, pointing device, and so forth to view error messages generated by the event monitor system 110 and, preferably, to allow a user to view information about the data link being monitored. The monitor system 110 of the present invention can operate under a fixed set of parameters, although in preferred embodiments, the user interface allows a user to determine the characteristics of the event monitor 110 by inputting values for one or more parameters used by the event monitor system 110 in detecting possible error conditions. Also, in certain embodiments, a user can input instructions to initiate corrective or remedial action via the user interface 120, such as a program designed to correct the error condition, shutting down one or more devices or links, saving data to a storage medium to minimize data loss, and the like. The operation of event monitor system 110 is described below by way of reference to FIGS. 3–14. The major data elements and procedure blocks of event monitor 110 are described below in reference to FIG. 16.

The data link 130 may be a link in a network environment, such as a telecommunication network, local area network (LAN), metropolitan area network (MAN), wide area network (WAN), and the like. The user interface 120 can be implemented at any convenient location on the link, or in the case of a network, at any convenient location on the network. Advantageously, user interface 120 is a workstation console used to oversee the network.

Likewise, the event monitor system 110 can be implemented in software, firmware, hardware, or any combination thereof, contained within any intelligent, programmable, or programmed device on the data link 130, such as one or more of connected devices 140–150, or, in the case of a network environment, other networked devices. Advantageously, event monitor 110 is implemented in software running on a device providing the user interface 120. The event monitor can be implemented as a standalone application or can be implemented as a module or function within a hardware management system.

Although the data link 130 is described herein primarily in reference to a data link in a communication network, any data link is contemplated in which there may be defined some event to be monitored. For example, the present invention can be used to monitor communication between peripheral devices and an input/output system of a computer system. The system is monitored for specified events that may be indicative of an error condition. Likewise, device behavior and data traffic over a data bus, such as a Peripheral Component Interconnect (PCI) bus and the like, can be monitored for events, such as protocol violations, and so forth. Finally, although the event monitor of the present invention itself is implemented in a digital information handling or data processing system, the events that are monitored are not limited to digital data transmissions. Thus, analog signals or events can be monitored, for example, with digitization or other processing/interpretation being performed by a sensor or other device reporting events to the event monitor system 110.

Figure 2:
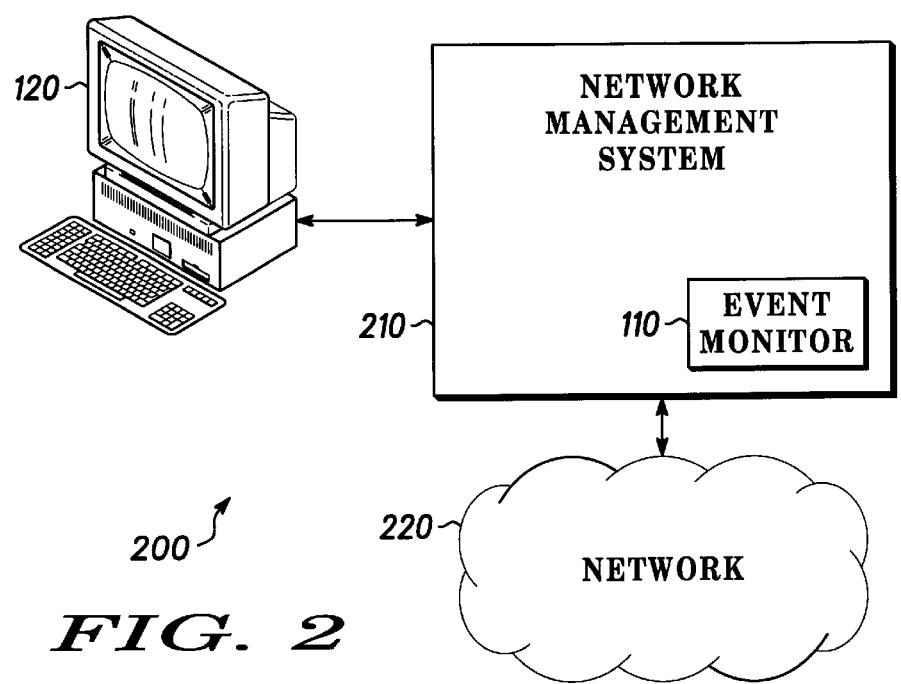
FIG. 2 is a block diagram illustrating a network system employing the event monitor of the present invention.

Referring now to FIG. 2, there is shown a block diagram of a network system 200 employing the event monitor 110 of the present invention. Network system 200 may be a telecommunication network, LAN, MAN, WAN, and the like. Network system 200 comprises a user interface 120, a network management system 210 or other administrative software controlling a network 220, the network management system 210 comprising the event monitor system 110.

The network management system 210 is of the type providing one or more network management functions, such as data traffic planning, management, analysis, or otherwise directing, controlling and/or monitoring communications over the network. In a preferred embodiment, the event monitor system 110 is implemented as a module within a network management system in accordance with an existing network management protocol. Exemplary network management protocols include, but are not limited to, Simple Network Management Protocol (SNMP), Internet Control Message Protocol (ICMP), Common Management Information Protocol (CMIP), CMIP over TCP (CMOT), CMIP over LLC (CMOL), Common Management Information Services (CMIS), Distributed Management Environment (DME), or other network management protocols, including proprietary network management systems.

In the depicted embodiment, the event monitoring system 110 is shown for illustrative purposes as a module or subroutine within a larger network management system 210, however, an event monitor system 110 implemented as a standalone application is also contemplated. For example, in certain embodiments, the event monitoring system 110 is implemented as a software application executed by one or more processing systems of the network system 200. In further embodiments, the event monitoring system 110 is designed into a network device, e.g., onto the main logic board, or otherwise incorporated into an embedded controller. In still further embodiments, the event monitor is implemented in an embedded system or other specialized computer of a device connected to the network.

Network 220 is intended to encompass any collection of two or more electrical devices having a data link therebetween. The network is not limited to any type of network and can be, as stated above, wired, wireless, and optical networks, and interconnections thereof. The network can be a telecommunication network such as a digital or analog cellular or wireless telecommunications system, copper cable telecommunication system, satellite based communication system, and the like. Also, the network can be a local area network (LAN), metropolitan area network (MAN), wide area network (WAN). The network may have a client/server architecture. Network entities include, for example, information handling devices such as mainframe computers, minicomputers, desktop computers, e.g., PC- or Unix-based platforms, portable computers, e.g., notebook and handheld computers and the like, Internet appliances, wireless web browsers, cellular or digital wireless telephones, or other types of electrical devices communicating over the network, such as printers and other computer peripheral devices, medical devices, building control, plant equipment, and the like.

In one preferred embodiment, event monitor 110 is implemented in a fault management system within a cellular base station to distinguish between real and intermittent fault conditions. In another preferred embodiment, the event monitor 110 is implemented within a cellular phone or a cellular radio substation, for example, to monitor the data stream to determine when radio interference has reached an unacceptable level. In yet another preferred embodiment, the event monitor 110 is implemented in a multiple processor card environment to determine when one card has, in fact, failed.

Figure 3:
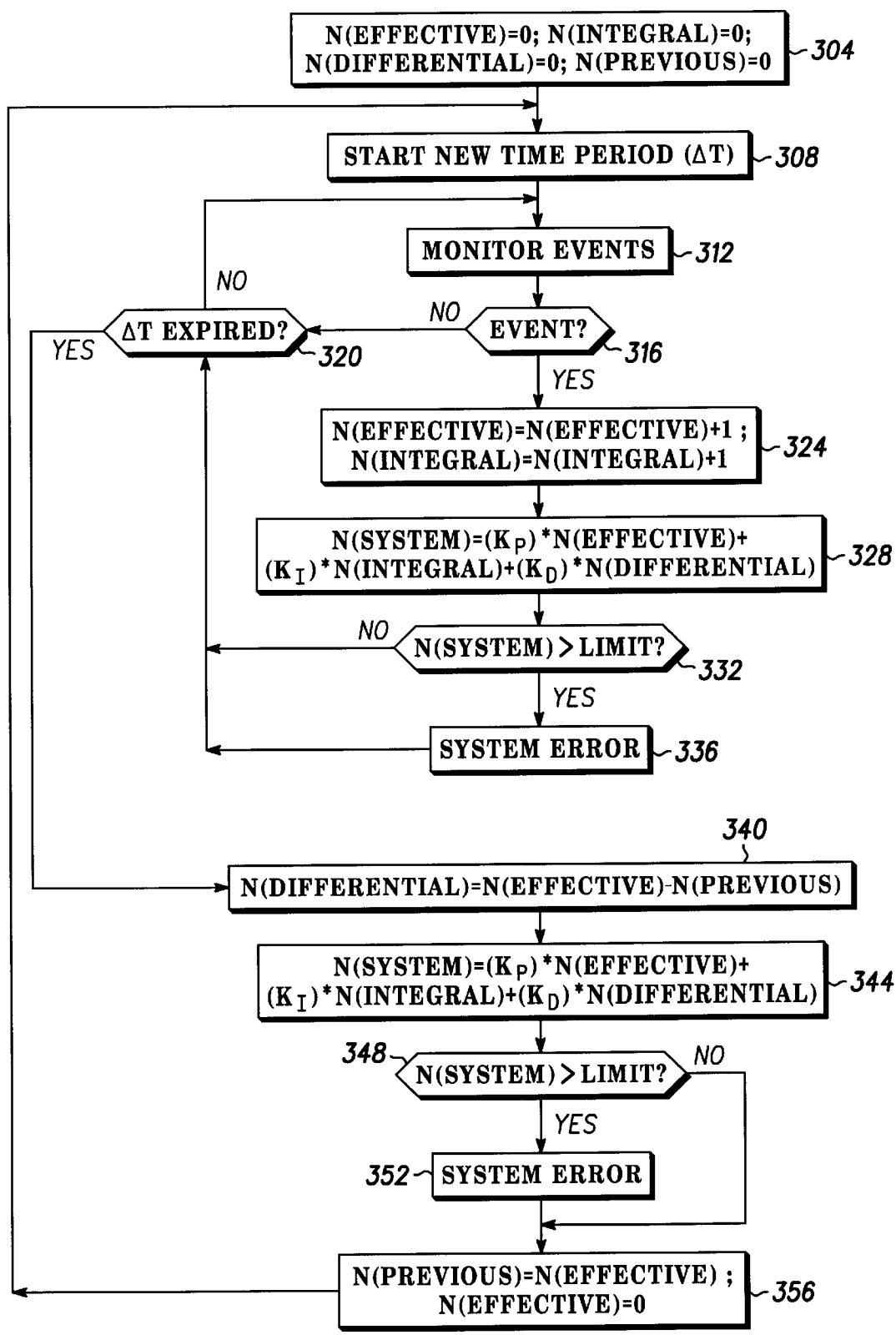
FIGS. 3–14 are a flow diagrams illustrating event monitoring methods according to twelve exemplary embodiments of the present invention.

FIG. 3 illustrates an event monitoring process 300 according to a first embodiment of the present invention. The process starts at step 304 and a value of zero is initially assigned to each of the following variables: (1) number of error events for the current time period, hereinafter N(EFFECTIVE); (2) the total number of error events for all time periods monitored, hereinafter N(INTEGRAL); (3) the number of events in the previous time period, hereinafter N(PREVIOUS); (4) the difference between the number of events in the two most recently calculated time periods, hereinafter N(DIFFERENTIAL).

In step 308, when event monitoring is to begin, a timer is started. The length of time in each time period ($\Delta T$) can be, for example, on the order of milliseconds up to hours, or longer, depending on the type and frequency of occurrence of the events to be monitored. The length of the time period is preferably user selectable, e.g., via user interface 120. The process waits at step 312 for the occurrence of one or more preselected events. Again, the occurrence of an event can be received as an output signal from one or more sensors, communicated over a data link, and so forth. If an event is not detected at step 316, and the time period has not expired at step 320, the process returns to step 312.

In an alternate embodiment, the time period is not started until an event occurs. For example, in a software implementation, an instance of the process 300 is not created until the first occurrence of the event, and the instance is subsequently destroyed after an error is reported or other steps are taken, as appropriate.

If an event is detected at step 316, the values for N(EFFECTIVE) and N(INTEGRAL) are incremented at step 324 and a system value, hereinafter N(SYSTEM), is calculated at step 328 by calculating:

$$N(\text{SYSTEM}) = K_P \cdot N(\text{EFFECTIVE}) + K_I \cdot N(\text{INTEGRAL}) + K_D \cdot N(\text{DIFFERENTIAL}), \quad \text{Eq. (1)}$$

wherein the coefficients $K_P$, $K_I$, and $K_D$ are predetermined weighting factors. The weighting factors are preferably selectable by the user to select the relative emphasis of each of the values N(EFFECTIVE), N(INTEGRAL), and N(DIFFERENTIAL), in determining whether an error is to be logged/reported. N(EFFECTIVE) serves as an indicator of what the system is doing in the current time period. N(DIFFERENTIAL) serves as a predictor of the system activity based on the current trend in the rate of events, anticipating if more, less, or the same amount of activity is likely to occur in the future. N(INTEGRAL) indicates how much activity has occurred over the entire history of the system. When combined in this way, a perspective is created that reflects not only what the event stream is doing, but also what is likely to happen in the future combined with what has happened in the past. In this manner, the trend component, i.e., N(DIFFERENTIAL) allows errors to be detected, and thus for corrective action to be taken, faster than the prior art methods allow. Likewise, by incorporating the history component, i.e., N(INTEGRAL), the present method is able to determine faster when an event condition has stabilized and is no longer of a concern. By allowing the user to select the weighting factors, the characteristics of the process can be adjusted. For example, by increasing the relative weighting of N(EFFECTIVE), emphasis is placed on what the system is currently doing. By increasing the relative weighting of N(DIFFERENTIAL), emphasis is placed on the trend. By increasing the relative weighting of N(INTEGRAL), emphasis is placed on the history. In certain embodiments, a weighted sum of N(EFFECTIVE), N(INTEGRAL), and N(DIFFERENTIAL) is used. In such embodiments, one or more of coefficients $K_P$, $K_I$, and $K_D$ may be zero. For example, if only trend and history information is needed, $K_P$ can be set to zero. In other embodiments, N(SYSTEM) is calculated using an unweighted or equally weighted sum of N(EFFECTIVE), N(INTEGRAL), and N(DIFFERENTIAL).

If the calculated value for N(SYSTEM) exceeds a predefined, preferably user selectable, system limit threshold value at step 332, a system error is reported at step 336 before proceeding to step 320. If N(SYSTEM) does not exceed the preselected limit, the process proceeds directly to step 320. The system error warning can be output in a number of ways, including the generation and logging of an error code, generation of detectable signal, such as an visual signal, e.g., an indicator light, a message such as a pop up message appearing on a display such as a display of user interface 120, and so forth, an audible signal, and the like, thereby alerting a user of a possible error condition. The user can then decide what action to take. Additionally, or alternatively, an error code can be generated to automatically initiate error correction, for example, to be performed by another application program upon receiving or detecting the error code.

By using N(SYSTEM) as an indicator, the history and trend are taken into consideration. Therefore, possible error conditions can be more accurately identified and can be detected earlier than by simply using rate thresholding techniques. In the event of a system error at step 332, the process can optionally end after reporting the error at step 336.

The process continues to step 320 and, if the time period has not expired, the process proceeds to step 312 and continues to monitor for events. If at step 320, the time period has expired, the process continues to step 340 and N(DIFFERENTIAL) is calculated as N(EFFECTIVE)–N(PREVIOUS). At step 344, N(SYSTEM) is again calculated, as described above. If N(SYSTEM) does not exceed the threshold value, the process proceeds directly to step 356. If N(SYSTEM) exceeds the threshold at step 348, an error is output at step 352 before proceeding to step 356. Optionally, if N(SYSTEM) exceeds the threshold value at step 348, the process ends after step 352. At step 356, the value for N(PREVIOUS) is assigned the current value of N(EFFECTIVE) and the value for N(EFFECTIVE) is then set to zero. The process then returns to step 308 and repeats.

Figure 4:
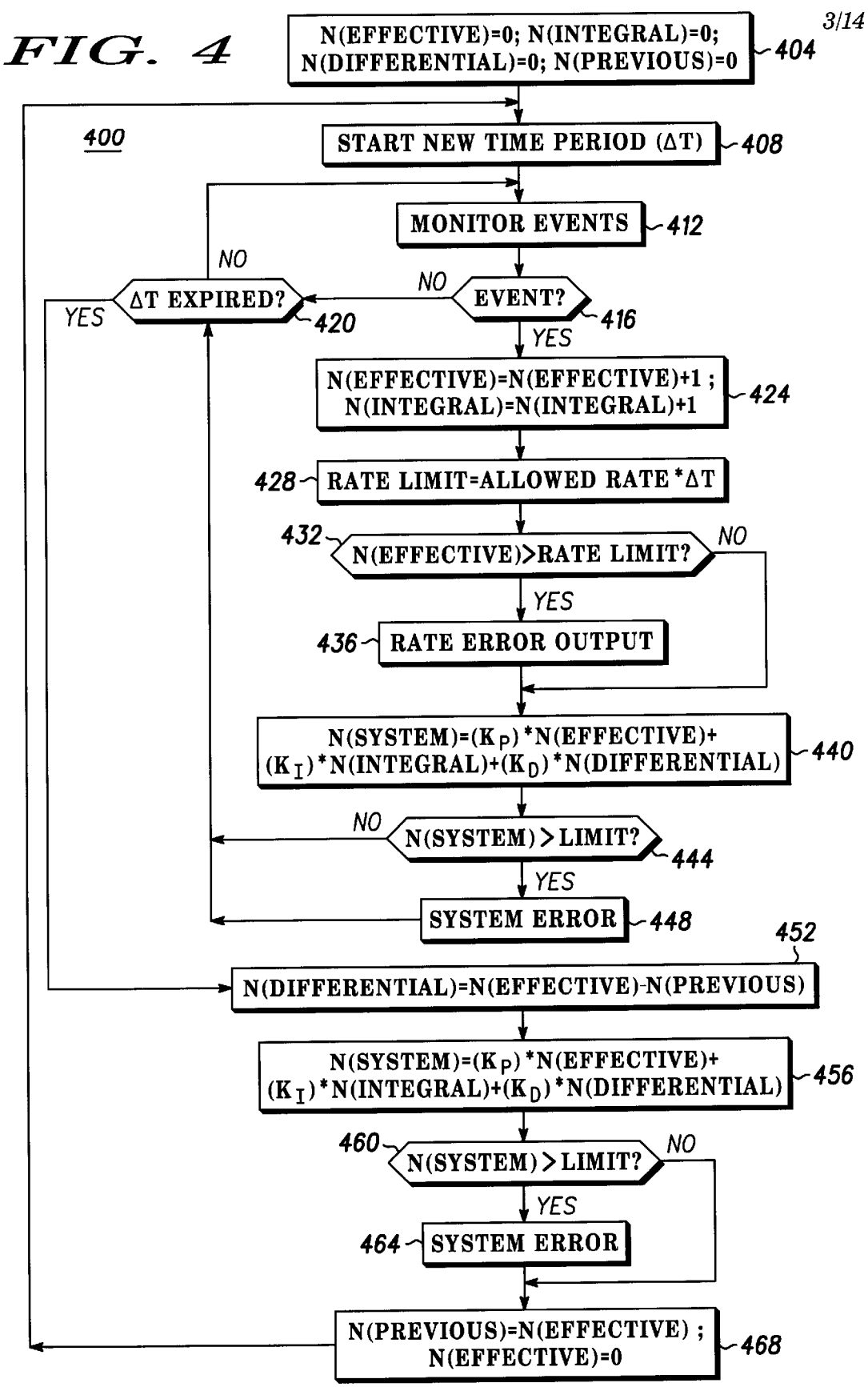

FIG. 4 illustrates an error monitoring process 400 according to a second embodiment of the present invention. The process starts at step 404 and a value of zero is initially assigned to each of N(EFFECTIVE), N(INTEGRAL), N(PREVIOUS), and N(DIFFERENTIAL), as defined above.

In step 408, when event monitoring is to begin, a timer is started and the process waits at step 412 for the occurrence of one or more preselected events. In an alternate embodiment, the time period is not started until an event occurs. If an event is not detected at step 416, and the time period has not expired at step 420, the process returns to step 412.

If an event is detected at step 416, the values for N(EFFECTIVE) and N(INTEGRAL) are incremented at step 424, and a rate limit is assigned or calculated at step 428. In the preferred embodiment, the rate limit is some predefined and preferably some user selectable maximum allowed rate of error occurrence multiplied by the length of the time period, $\Delta T$, also preferably a user selectable value. In this manner, the rate limit value is calculated using only multiplication and the value for N(EFFECTIVE) is effectively a measure of the rate of occurrence of events. Thus, if N(EFFECTIVE) exceeds the rate limit value at step 432, a rate error is output/logged at step 436 before proceeding to step 440. If N(EFFECTIVE) does not exceed the rate limit at step 432, the process proceeds directly to step 440. By using $\Delta T$ as the unit of time at step 428, the need to use a more complicated division operation in calculating the rate is avoided, which is advantageous where the event monitor is implemented in an embedded system or a system which otherwise is limited in resources. Alternately, by simply preselecting a threshold value for N(EFFECTIVE), a multiplication operation is avoided, thus simplifying the event monitoring even further. Of course, calculating the rate by other means, such as counting the events and dividing the number of events counted by the elapsed time, is also contemplated. Optionally, the process ends after an error is reported in step 436.

At step 440, N(SYSTEM) is calculated as described above and, if the calculated value for N(SYSTEM) exceeds the threshold value at step 444, a system error is reported at step 448 before proceeding to step 420. If N(SYSTEM) does not exceed the preselected limit, the process proceeds directly to step 420.

At step 420, if the time period has not expired, the process proceeds to step 412 and continues to monitor for events. If at step 420, the time period has expired, the process continues to step 452 and N(DIFFERENTIAL) is calculated as N(EFFECTIVE)–N(PREVIOUS). At step 456, N(SYSTEM) is again calculated. If N(SYSTEM) does not exceed the threshold value at step 460, the process proceeds directly to step 468. If N(SYSTEM) exceeds the threshold at step 460, an error is output at step 464 before proceeding to step 468. Optionally, if N(SYSTEM) exceeds the threshold value at step 460, the process ends after the error output of step 464. At step 468, the value for N(PREVIOUS) is assigned the current value of N(EFFECTIVE) and the value for N(EFFECTIVE) is then set to zero. The process then returns to step 408 and repeats.

By using both the rate limit value and N(SYSTEM) as indicators of possible error conditions, such conditions can be detected earlier. In preferred embodiments, the manner of the output is such that the rate error output of step 436 and the system error output of step 448 or 464 are distinguishable as such so as to provide the user with more information about the nature of the error condition. The user is then more informed in determining why the error condition occurred and what action to take.

Figure 5:
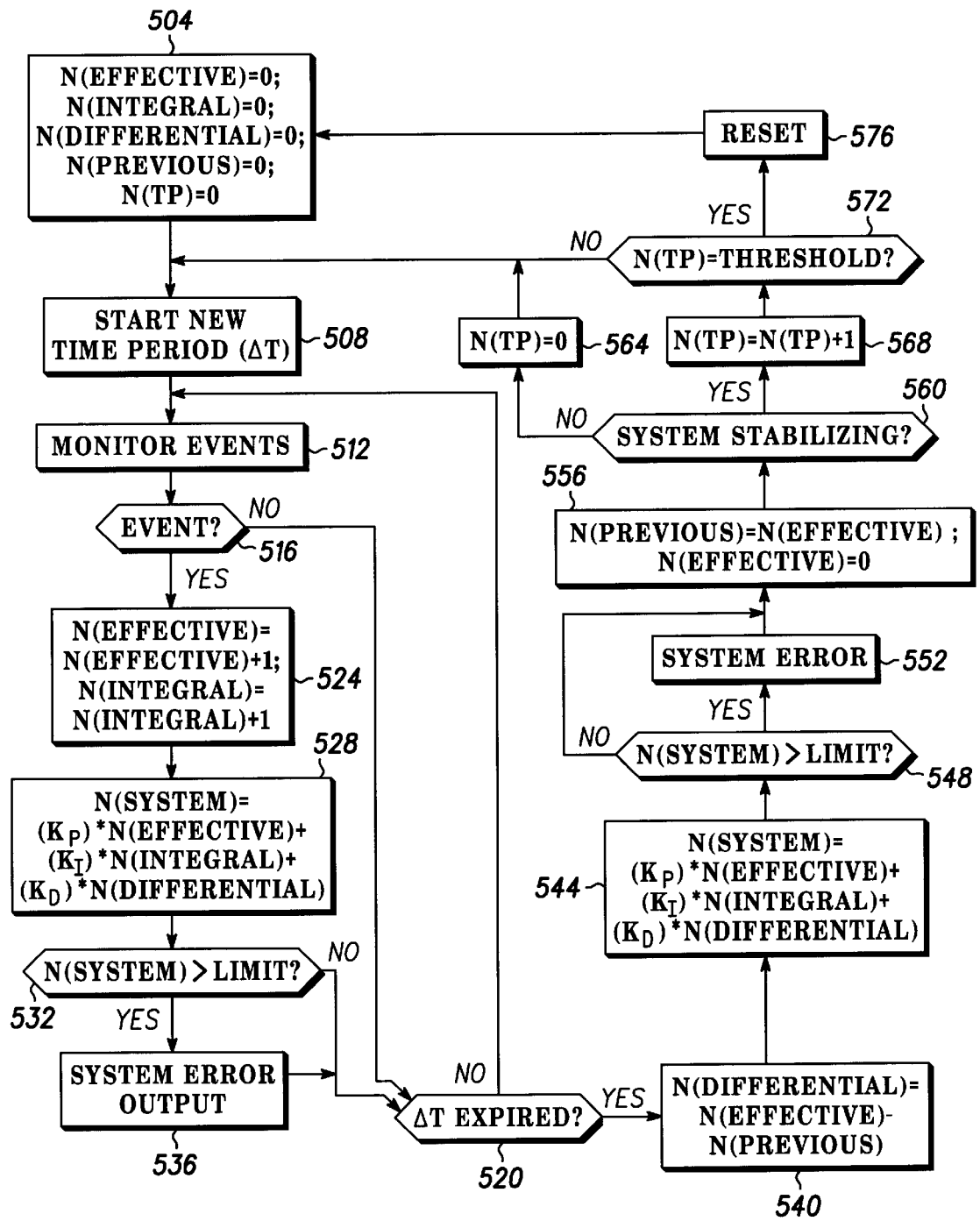

FIG. 5 illustrates an error monitoring process 500 according to a third embodiment of the present invention. The process starts at step 504 and a value of zero is initially assigned to each of the variables N(EFFECTIVE), N(INTEGRAL), N(PREVIOUS), and N(DIFFERENTIAL), as defined above, and the number of time periods monitored in which the system appears stable, hereinafter N(TP), i.e., the number of successive time periods in which the number of events occurring has stayed the same or decreased, e.g., wherein N(DIFFERENTIAL) is less than or equal to zero.

In step 508, when event monitoring is to begin, a timer is started and the process waits at step 512 for the occurrence of one or more preselected events. In an alternate embodiment, the time period is not started until an event occurs. If an event has not occurred at step 516, and the time period has not expired at step 520, the process returns to step 512.

If an event monitored for is detected at step 516, the values for N(EFFECTIVE) and N(INTEGRAL) are incremented at step 524, and the system value N(SYSTEM) is calculated at step 528 in accordance with Eq. (1). If the calculated value for N(SYSTEM) exceeds the threshold value at step 532, a system error is reported at step 536 before proceeding to step 520. If N(SYSTEM) does not exceed the preselected limit, the process proceeds directly to step 520.

At step 520, if the time period has not expired, the process proceeds to step 512 and event occurrences are continued to be monitored. If at step 520, the time period has expired, the process continues to step 540 and N(DIFFERENTIAL) is calculated as N(EFFECTIVE)–N(PREVIOUS). At step 544, N(SYSTEM) is again calculated. If N(SYSTEM) does not exceed the threshold value at step 548, the process proceeds directly to step 556. If N(SYSTEM) exceeds the threshold at step 548, an error is output at step 552 before proceeding to step 556. Optionally, if N(SYSTEM) exceeds the threshold value at step 548, the process ends with the error output at step 552. At step 556, the value for N(PREVIOUS) is assigned the current value of N(EFFECTIVE) and the value for N(EFFECTIVE) is then set to zero.

The process then continues to step 560 and it is determined whether there is an indication of system stability. A number of methods can be used to determine whether there is, based on the monitored events, an indicium of stability, and can be selected according to the application. For example, when N(DIFFERENTIAL) is less than zero, there is an indication that the number of detected events per time period has decreased in consecutive time periods, thus providing an indication that the system is stabilizing. If N(DIFFERENTIAL) is zero, that means that the number of events has remained constant in two consecutive time periods, which may also be an indication of stability, particularly where a constant number of events per time period is desirable, such as in monitoring the frequency of a clocking source. In a preferred embodiment, N(SYSTEM) is compared with the N(SYSTEM) value for the previous time period, and the system is seen as stabilizing if N(SYSTEM) remains unchanged in consecutive time periods (or where the N(SYSTEM) value remains substantially the same, i.e., the difference within some modest, predetermined range).

If the system appears to be stabilizing at step 560, for example, by examining N(SYSTEM) for consecutive time periods or N(DIFFERENTIAL), the value for N(TP) is incremented at step 568 and the process continues to step 572. N(TP) thus provides a counter for the number of time periods in which the system appears to be stabilizing. If the system does not appear to be stabilizing, N(TP) is to set zero at step 564 before returning to step 508.

If N(TP) has not reached some preselected, preferably user selectable, threshold at step 572, the process returns to step 508. If N(TP) has reached the threshold, i.e., one or more selected indicia of stability have appeared for some preselected number of consecutive time periods, the system is considered to be stable and the system is reset at step 576. Preferably, an indication of system stability is output in step 576. The indication can be output in a number of ways, including the generation and logging of a "system stable" code, generation of detectable signal, such as an visual signal, e.g., an indicator light, a message such as a pop up message appearing on a display such as a display of user interface 120, and so forth, an audible signal, clearing or withdrawing any error warning generated in either or both of steps 536 and 552, and so forth, so as to inform a user that the system is now stable. In this manner, the user can make a more informed decision as to what action to take, such as suspending corrective actions planned or initiated based on an earlier warning. The process returns to step 504, N(EFFECTIVE), N(INTEGRAL), N(DIFFERENTIAL), N(PREVIOUS), and N(TP) are reset to zero, and the process repeats. Optionally, the process ends, or is suspended until further events are detected, at step 576 when the system is stable.

Figure 6:
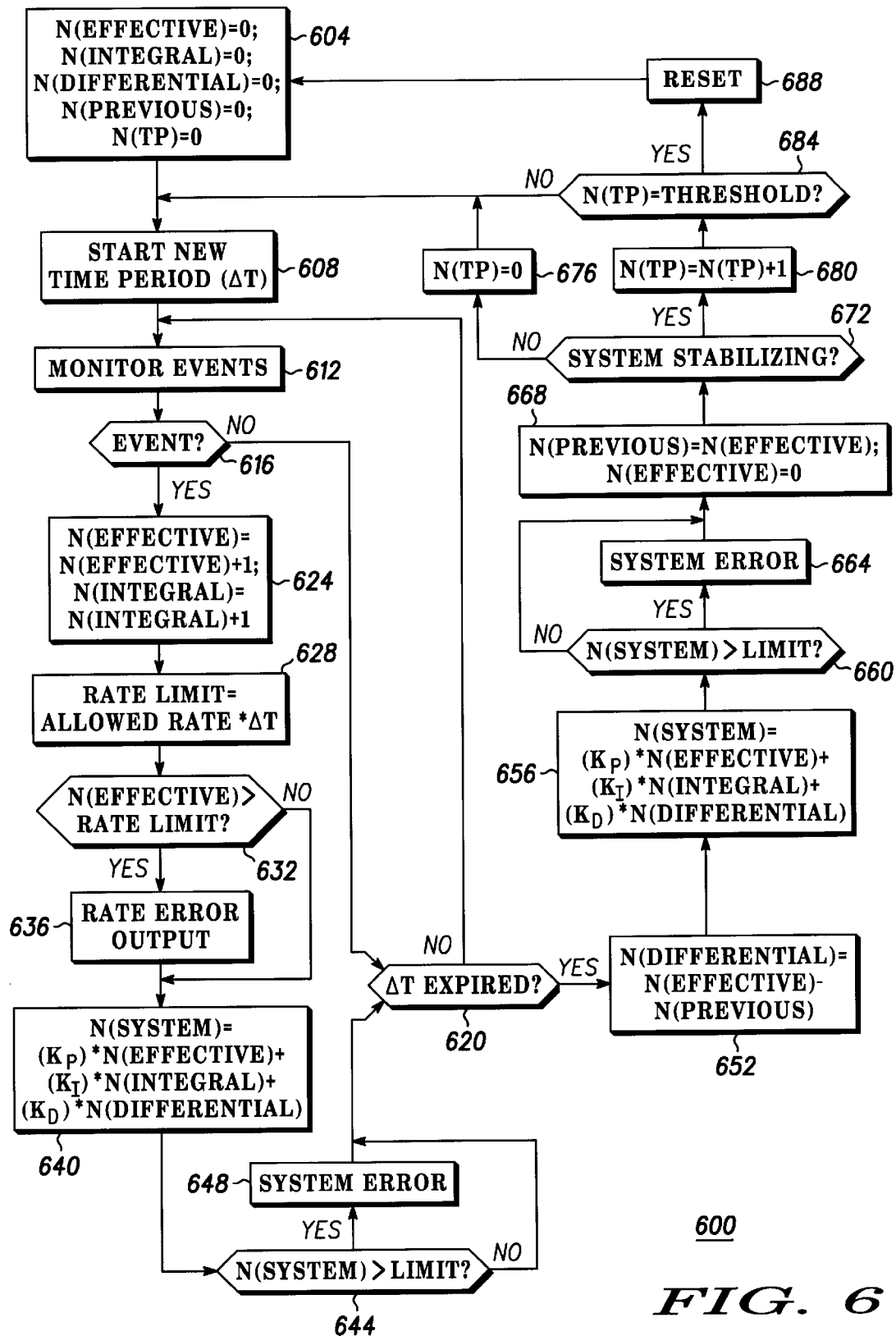

FIG. 6 illustrates an error monitoring process 600 according to a fourth embodiment of the present invention. The process starts at step 604 and a value of zero is initially assigned to each of the variables N(EFFECTIVE), N(INTEGRAL), N(PREVIOUS), N(DIFFERENTIAL), and N(TP), as defined above.

In step 608, when event monitoring is to begin, a timer is started and the process waits at step 612 for the occurrence of one or more preselected events. In an alternate embodiment, the time period is not started until an event occurs. If an event has not occurred at step 616, and the time period has not expired at step 620, the process returns to step 612.

If an event monitored for is detected at step 616, the process proceeds to step 624, the values for N(EFFECTIVE) and N(INTEGRAL) are incremented at step 624, and a rate limit is assigned or calculated at step 628. Again, the rate limit is some predefined and preferably user selectable value that is multiplied by the ΔT and compared with the value for N(EFFECTIVE), although other methods for calculating the rate are also contemplated. If N(EFFECTIVE) exceeds the rate limit at step 632, a rate error is output/logged at step 636 before proceeding to step 640, otherwise, the process proceeds directly to step 640. Optionally, the process ends when an error is reported in step 636.

The system value N(SYSTEM) is calculated at step 640 in accordance with Eq. (1). If the calculated value for N(SYSTEM) exceeds the threshold value at step 644, a system error is reported at step 648 before proceeding to step 620. If N(SYSTEM) does not exceed the preselected limit, the process proceeds directly to step 620.

If, at step 620, if the time period has not expired, the process proceeds to step 612 and event occurrences are continued to be monitored. If at step 620, the time period has expired, the process continues to step 652 and N(DIFFERENTIAL) is calculated as N(EFFECTIVE)–N(PREVIOUS). At step 656, N(SYSTEM) is again calculated. If N(SYSTEM) does not exceed the threshold value at step 660, the process proceeds directly to step 668. If N(SYSTEM) exceeds the threshold at step 660, an error is output at step 664 before proceeding to step 668. Optionally, if N(SYSTEM) exceeds the threshold value at step 660, the process ends with the error output at step 664.

At step 668, the value for N(PREVIOUS) is assigned the current value of N(EFFECTIVE) and the value for N(EFFECTIVE) is then set to zero. The process then continues to step 672 and it is determined whether there is an indication that the system is stabilizing, as described above. If the system does appear to be stabilizing, the value for N(TP) is incremented at step 680 to provide a counter for the number of time periods in which the system appears to be stabilizing before proceeding to step 684. If the one or more selected indicia of stability do not appear at step 672, N(TP) is reset to zero at step 676 before returning to step 608.

If N(TP) has not reached some preselected, preferably user selectable, threshold at step 684, the process returns to step 608. If N(TP) has reached the threshold at step 684, the system is considered stable and the system is reset at step 688. Preferably, an indication of system stability as described above is output in step 688. Also, any earlier generated error can be withdrawn. The process returns to step 604, N(EFFECTIVE), N(INTEGRAL), N(DIFFERENTIAL), N(PREVIOUS), and N(TP) are reset, and the process repeats. Optionally, the process ends at step 688. Preferably, manner of error output is such that the rate error output of step 636 and the system error output of step 648 and 664 are distinguishable so as to provide the user with more information about the nature of the error condition.

Figure 7:
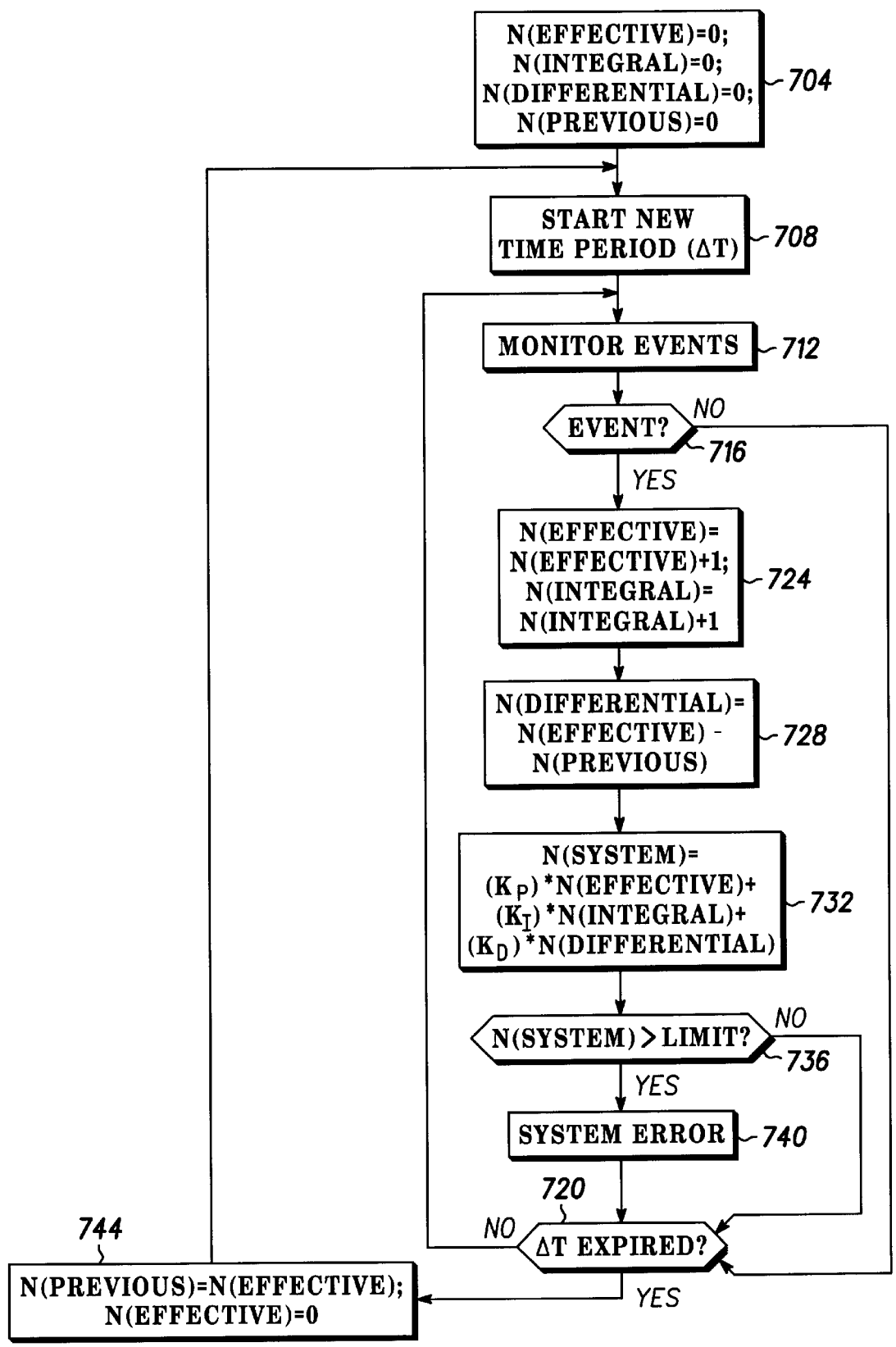

FIG. 7 illustrates an exemplary embodiment of the event monitoring process 700 according to a fifth embodiment of the present invention. The process starts at step 704 and a value of zero is initially assigned to each of the variables N(EFFECTIVE), N(INTEGRAL), N(PREVIOUS), and N(DIFFERENTIAL).

In step 708, when event monitoring is to begin, a timer is started and the process waits at step 712 for the occurrence of one or more preselected events. In an alternate embodiment, the time period is not started until an event occurs. If an event is not detected at step 716, and the time period has not expired at step 720, the process returns to step 712.

If an event is detected at step 716, the values for N(EFFECTIVE) and N(INTEGRAL) are incremented at step 724 and N(DIFFERENTIAL) is calculated as N(EFFECTIVE)–N(PREVIOUS) at step 728. At step 732, N(SYSTEM) is calculated according to Eq. 1.

If the calculated value for N(SYSTEM) exceeds a predefined, preferably user selectable, system limit threshold value at step 736, a system error is reported at step 740 before proceeding to step 720. If N(SYSTEM) does not exceed the preselected limit, the process proceeds directly to step 720. Optionally, the process ends after reporting an error at step 740.

At step 720, if the time period has not expired, the process returns to step 712 and monitoring continues. If the time period has expired at step 720, the process proceeds to step 744 and the value for N(PREVIOUS) is assigned the current value of N(EFFECTIVE) and the value for N(EFFECTIVE) is then set to zero. The process then returns to step 708 and repeats.

Figure 8:
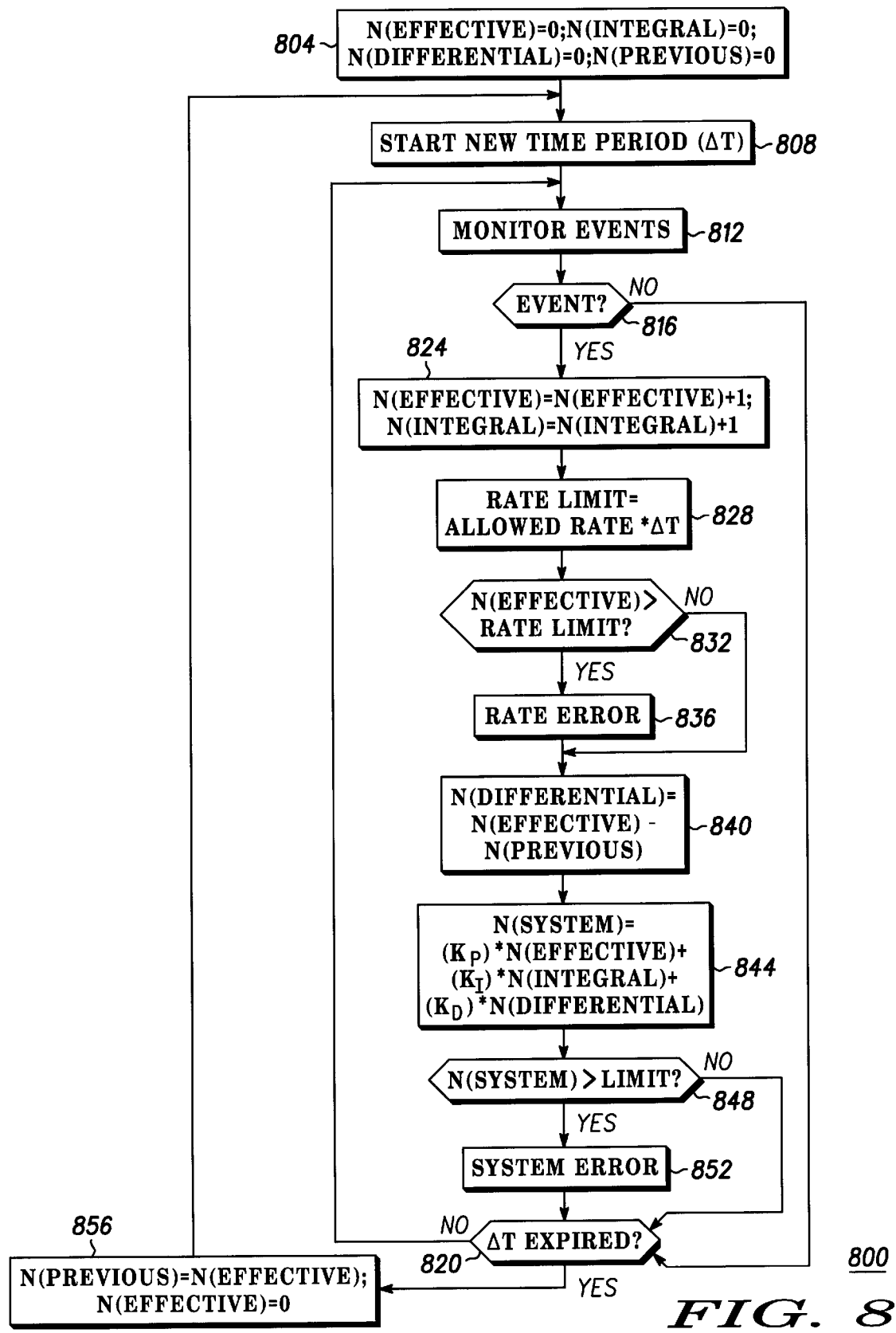

FIG. 8 illustrates an error monitoring process 800 according to a sixth embodiment of the present invention. The process starts at step 804 and a value of zero is initially assigned to each of N(EFFECTIVE), N(INTEGRAL), N(PREVIOUS), and N(DIFFERENTIAL), as defined above.

In step 808, when event monitoring is to begin, a timer is started and the process waits at step 812 for the occurrence of one or more preselected events. In an alternate embodiment, the time period is not started until an event occurs. If an event is not detected at step 816, and the time period has not expired at step 820, the process returns to step 812.

If an event is detected at step 816, the values for N(EFFECTIVE) and N(INTEGRAL) are incremented at step 824, and a rate limit is assigned or calculated at step 828, representing some preselected maximum as described above, preferably some preselected maximum allowed rate multiplied by the length of the time period, ΔT. Other methods of determining the rate of event occurrence are also contemplated. If N(EFFECTIVE) exceeds the rate limit value at step 832, a rate error is output/logged at step 836 and the process continues to step 840. If N(EFFECTIVE) does not exceed the rate limit at step 832, the process proceeds directly to step 840. Optionally, the process ends after an error is reported in step 836.

At step 840, N(DIFFERENTIAL) is calculated as described above and at step 844, N(SYSTEM) is calculated according to Eq. 1. If the calculated value for N(SYSTEM) exceeds the threshold value at step 848, a system error is reported at step 852 before proceeding to step 820. If N(SYSTEM) does not exceed the preselected limit, the process proceeds directly to step 820. Optionally, the process ends after reporting an error at step 852.

At step 820, if the time period has not expired, the process proceeds to step 812 and continues to monitor for events. If at step 820, the time period has expired, the process continues to step 856 wherein the value for N(PREVIOUS) is assigned the current value of N(EFFECTIVE) and the value for N(EFFECTIVE) is then set to zero. The process then returns to step 808 and repeats. Preferably, manner of the rate error output of step 836 and the system error output of step 852 are distinguishable.

Figure 9:
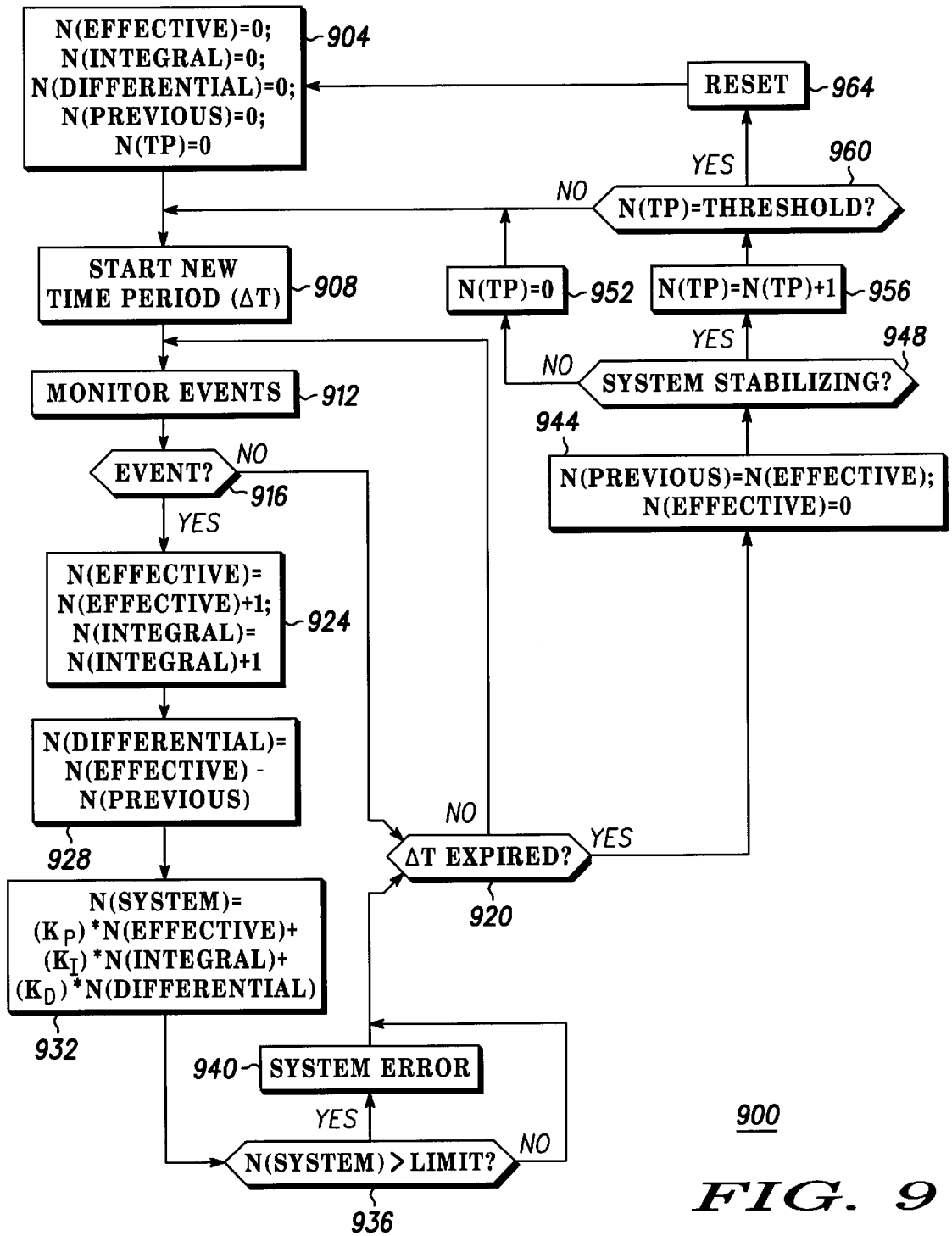

FIG. 9 illustrates an error monitoring process 900 according to a seventh embodiment of the present invention. The process starts at step 904 and a value of zero is initially assigned to each of the variables N(EFFECTIVE), N(INTEGRAL), N(PREVIOUS), and N(DIFFERENTIAL), and N(TP), as defined above.

In step 908, when event monitoring is to begin, a timer is started and the process waits at step 912 for the occurrence of one or more preselected events. In an alternate embodiment, the time period is not started until an event occurs. If an event has not occurred at step 916, and the time period has not expired at step 920, the process returns to step 912.

If an event monitored for is detected at step 916, the values for N(EFFECTIVE) and N(INTEGRAL) are incremented at step 924, and N(DIFFERENTIAL) is calculated at step 928. The system value N(SYSTEM) is calculated at step 932 in accordance with Eq. (1). If the calculated value for N(SYSTEM) exceeds the threshold value at step 936, a system error is reported at step 940 before proceeding to step 920. If N(SYSTEM) does not exceed the preselected limit, the process proceeds directly to step 920. Optionally, the process ends after reporting an error at step 940.

At step 920, if the time period has not expired, the process proceeds to step 912 and event occurrences are continued to be monitored. If the time period has expired at step 920, the process continues to step 944 and N(PREVIOUS) is assigned the current value of N(EFFECTIVE) and the value for N(EFFECTIVE) is then set to zero.

The process then continues to step 948 and it is determined whether there is an indication that the system is stabilizing, as described above. If the system does appear to be stabilizing, the value for N(TP) is incremented at step 956 to provide a counter for the number of time periods in which the system appears to be stabilizing before proceeding to step 960. If the one or more selected indicia of stability do not appear at step 948, N(TP) is reset to zero at step 952 before returning to step 908.

If N(TP) has not reached some preselected, preferably user selectable, threshold at step 960, the process returns to step 908. If N(TP) has reached the threshold at step 960 (i.e., the selected indicium of stability has appeared for some preselected number of consecutive time periods), the system is considered to be stable and the system is reset at step 964. Preferably, an indication of system stability is output in step 964. The process returns to step 904, N(EFFECTIVE), N(INTEGRAL), N(DIFFERENTIAL), N(PREVIOUS), and N(TP) are reset, and the process repeats. Optionally, the process ends at step 964.

Figure 10:
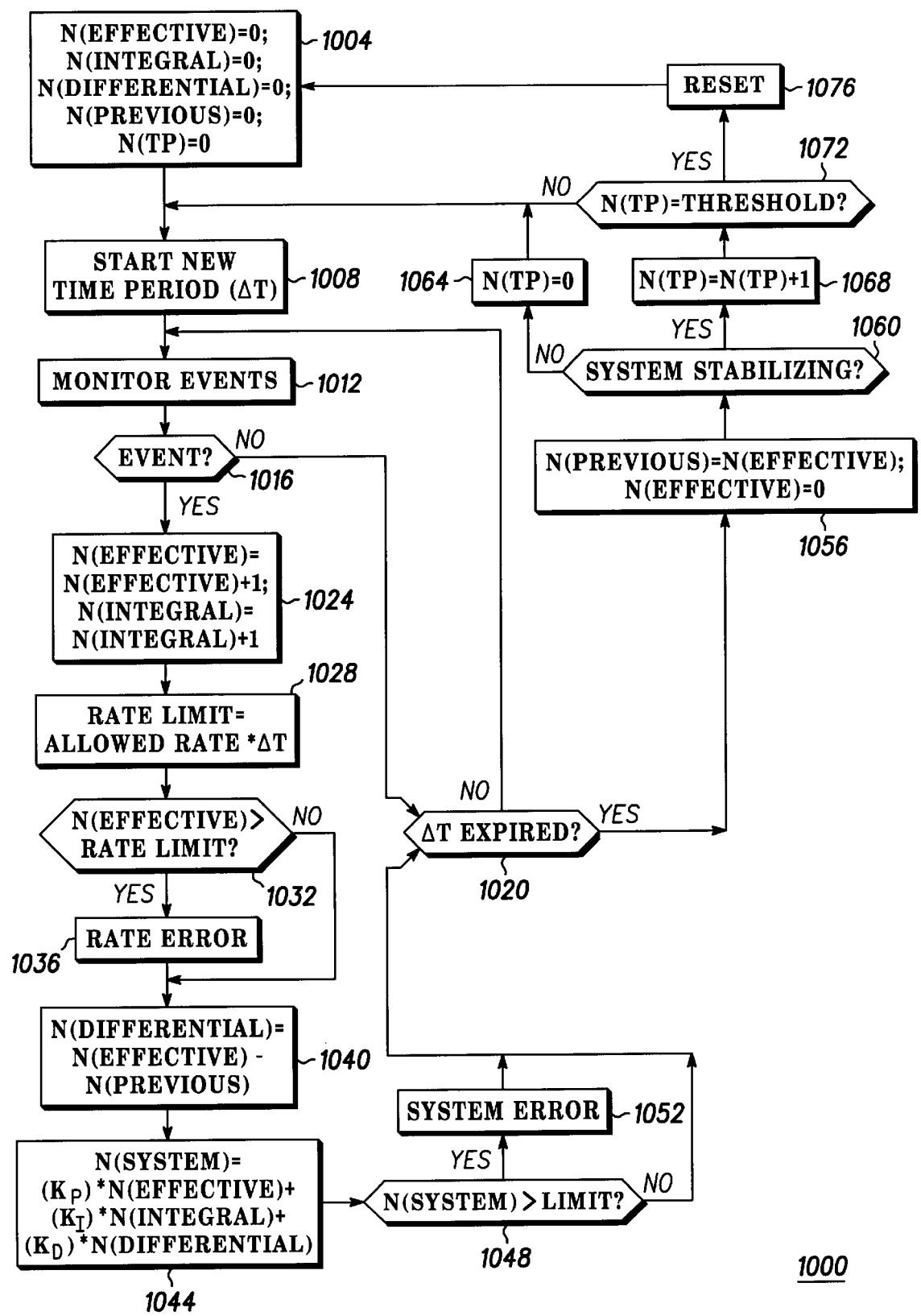

FIG. 10 illustrates an error monitoring process 1000 according to an eighth embodiment of the present invention. The process starts at step 1004 and a value of zero is initially assigned to each of the variables N(EFFECTIVE), N(INTEGRAL), N(PREVIOUS), and N(DIFFERENTIAL), and N(TP), as defined above.

In step 1008, when event monitoring is to begin, a timer is started and the process waits at step 1012 for the occurrence of one or more preselected events. In an alternate embodiment, the time period is not started until an event occurs. If an event has not occurred at step 1016, and the time period has not expired at step 1020, the process returns to step 1012.

If an event monitored for is detected at step 1016, the process proceeds to step 1024 and the values for N(EFFECTIVE) and N(INTEGRAL) are incremented. At step 1028, a rate limit is assigned or calculated. Again, the rate limit is some predefined and preferably user selectable value that is multiplied by the ΔT and compared with the value for N(EFFECTIVE), although other methods for calculating the rate are also contemplated. If N(EFFECTIVE) exceeds the rate limit at step 1032, a rate error is output/logged at step 1036 before proceeding to step 1040, otherwise, the process proceeds directly to step 1040. Optionally, the process ends when an error is reported in step 1036.

N(DIFFERENTIAL) is calculated as N(EFFECTIVE)−N(PREVIOUS) at step 1040. The system value N(SYSTEM) is calculated at step 1044 in accordance with Eq. (1). If the calculated value for N(SYSTEM) exceeds the threshold value at step 1048, a system error is returned at step 1052 before proceeding to step 1020. If N(SYSTEM) does not exceed the preselected limit, the process proceeds directly to step 1020.

If, at step 1020, if the time period has not expired, the process proceeds to step 1012 and event occurrences are continued to be monitored. If, at step 1020, the time period has expired, the process continues to step 1056.

At step 1056, the value for N(PREVIOUS) is assigned the current value of N(EFFECTIVE) and the value for N(EFFECTIVE) is then set to zero. The process then continues to step 1060 and it is determined whether there is an indication that the system is stabilizing, as described above. If the system does appear to be stabilizing, the value for N(TP) is incremented at step 1068 to provide a counter for the number of time periods in which the system appears to be stabilizing. If the one or more selected indicia of stability do not appear at step 1060, N(TP) is reset to zero at step 1064 before returning to step 1008.

If N(TP) has not reached some preselected, preferably user selectable, threshold at step 1072, the process returns to step 1008. If N(TP) has reached the threshold at step 1072, the system is considered stable and the system is reset at step 1076. Preferably, an indication of system stability as described above is output in step 1076. Also, any earlier generated error can be withdrawn. The process returns to step 1004, N(EFFECTIVE), N(INTEGRAL), N(DIFFERENTIAL), N(PREVIOUS), and N(TP) are reset, and the process repeats. Optionally, the process ends at step 1076. Preferably, manner of the rate error output of step 1036 and the system error output of step 1052 are distinguishable.

Figure 11:
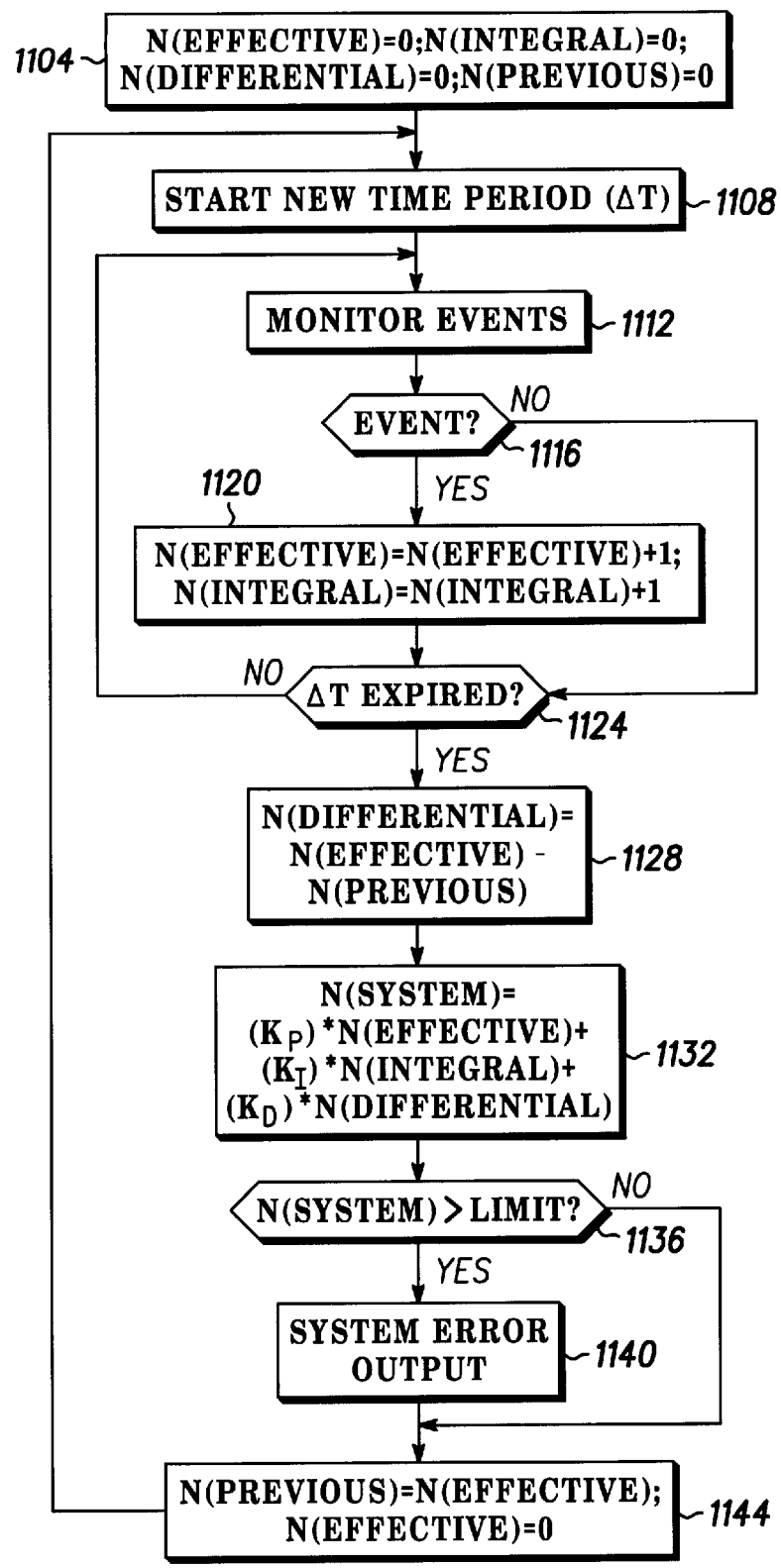

FIG. 11 illustrates an error monitoring process 1100 according to a ninth embodiment of the present invention. The process starts at step 1100 and a value of zero is initially assigned to each of the variables N(EFFECTIVE), N(INTEGRAL), N(PREVIOUS), and N(DIFFERENTIAL), as defined above.

In step 1108, when event monitoring is to begin, a new time period is started and the process waits for the occurrence of monitored for events at step 1112. Alternately, the time period is not started until an event is detected. If an event occurs at step 1116, N(EFFECTIVE) and N(INTEGRAL) are incremented at step 1120, and the process continues to step 1124. If an event does not occur at step 1116, the process proceeds directly to step 1124.

If the time period has not expired at step 1124, the process returns to step 1112 and repeats. If the time period has expired at step 1124, the process continues to step 1128.

At step 1128, a value for N(DIFFERENTIAL) is calculated by subtracting N(PREVIOUS) from N(EFFECTIVE), and at step 1132, N(SYSTEM) is calculated according to Eq. 1.

At step 1136, it is determined whether N(SYSTEM) exceeds some preselected, preferably user selectable, system limit threshold. If N(SYSTEM) does not exceed the threshold, the process proceeds directly to step 1144. If N(SYSTEM) does exceed the preselected threshold, a system error warning is generated in step 1140 before proceeding to step 1144. Optionally, the process ends at step 1140 with the system error output.

In step 1144, N(PREVIOUS) is assigned the value of N(EFFECTIVE) and then the value for N(EFFECTIVE) is set to zero. The process then loops back to step 1108 and repeats.

Figure 12:
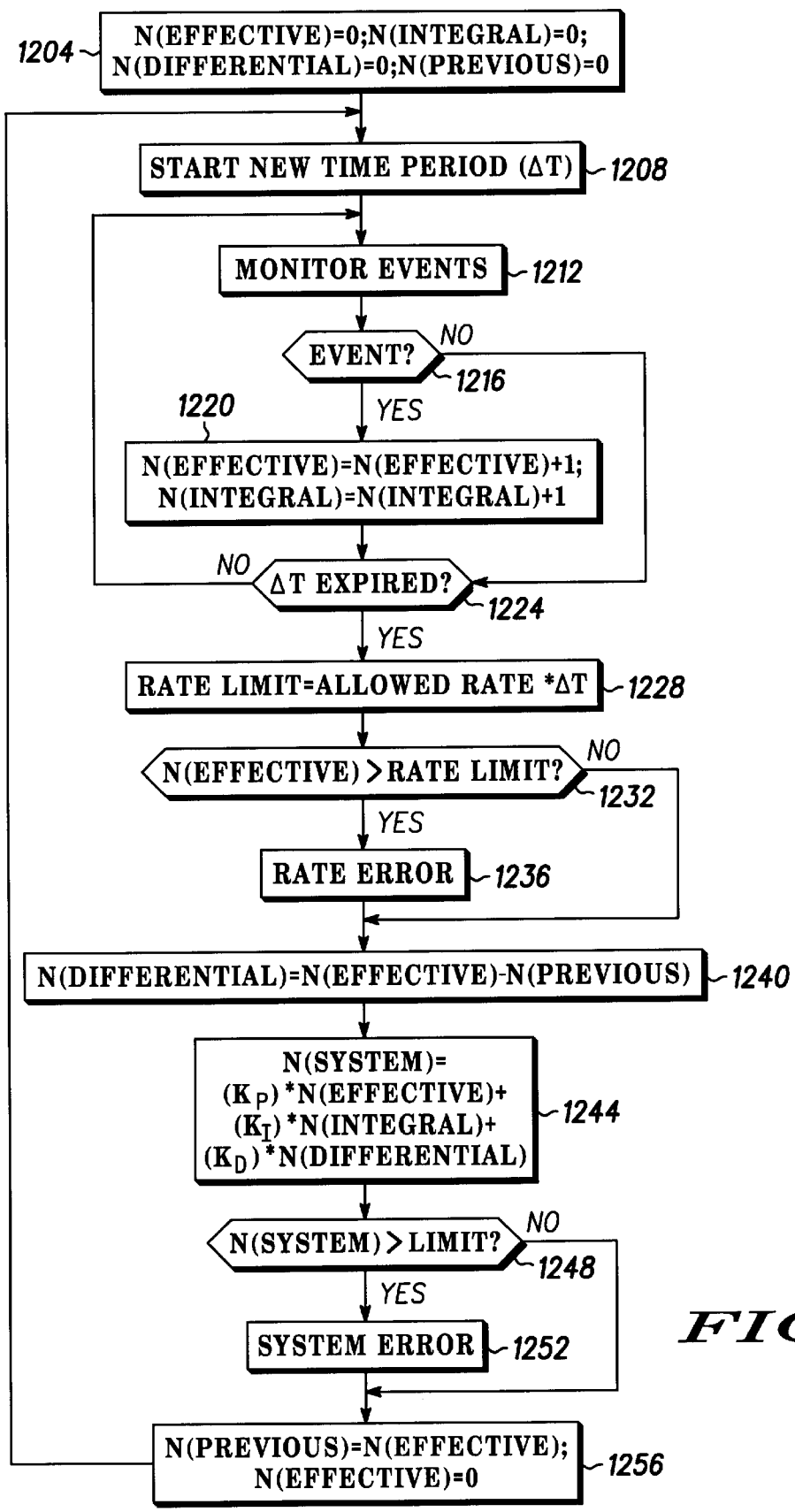

FIG. 12 illustrates an error monitoring process 1200 according to a tenth embodiment of the present invention. The process starts at step 1204 and a value of zero is initially assigned to N(EFFECTIVE), N(INTEGRAL), N(DIFFERENTIAL), and N(PREVIOUS), as defined above.

In step 1208, when event monitoring is to begin, a new time period is started, and events are monitored for at step 1212. Alternately, the time period is not started until an event is detected. At step 1216, if an event is not detected, the process proceeds directly to step 1224. If an event is detected at step 1216, the process proceeds to step 1220 and N(EFFECTIVE) and N(INTEGRAL) are incremented, before proceeding to step 1224.

At step 1224, it is determined whether the time period has expired. If the time period has not expired, the process returns to step 1212. If the time period has expired at step 1224, the process proceeds to step 1228.

At step 1228, a rate limit is assigned or calculated. Again, the rate limit is some predefined and preferably user selectable value that is multiplied by the $\Delta T$ and compared with the value for N(EFFECTIVE), although other methods for calculating the rate are also contemplated. If N(EFFECTIVE) exceeds the rate limit at step 1232, a rate error is output/logged at step 1236 before proceeding to step 1240, otherwise, the process proceeds directly to step 1240. Optionally, the process ends when an error is reported in step 1236.

At step 1240, a value for N(DIFFERENTIAL) is calculated by subtracting N(PREVIOUS) from N(EFFECTIVE) and at step 1244, N(SYSTEM) is calculated according to Eq. (1).

At step 1248, it is determined whether N(SYSTEM) calculated in step 1244 exceeds a threshold value. If N(SYSTEM) does not exceed the preselected limit, the process proceeds directly to step 1256. If N(SYSTEM) does exceed the preselected threshold, a system error warning or error code is generated in step 1252, as described above before proceeding to step 1256. Optionally, the process ends after reporting an error at step 1252.

At step 1256, N(PREVIOUS) is assigned the value of N(EFFECTIVE) and then the value for N(EFFECTIVE) is set to zero. The process then loops back to step 1208 and repeats. Preferably, manner of the rate error output of step 1236 and the system error output of step 1252 are distinguishable.

Figure 13:
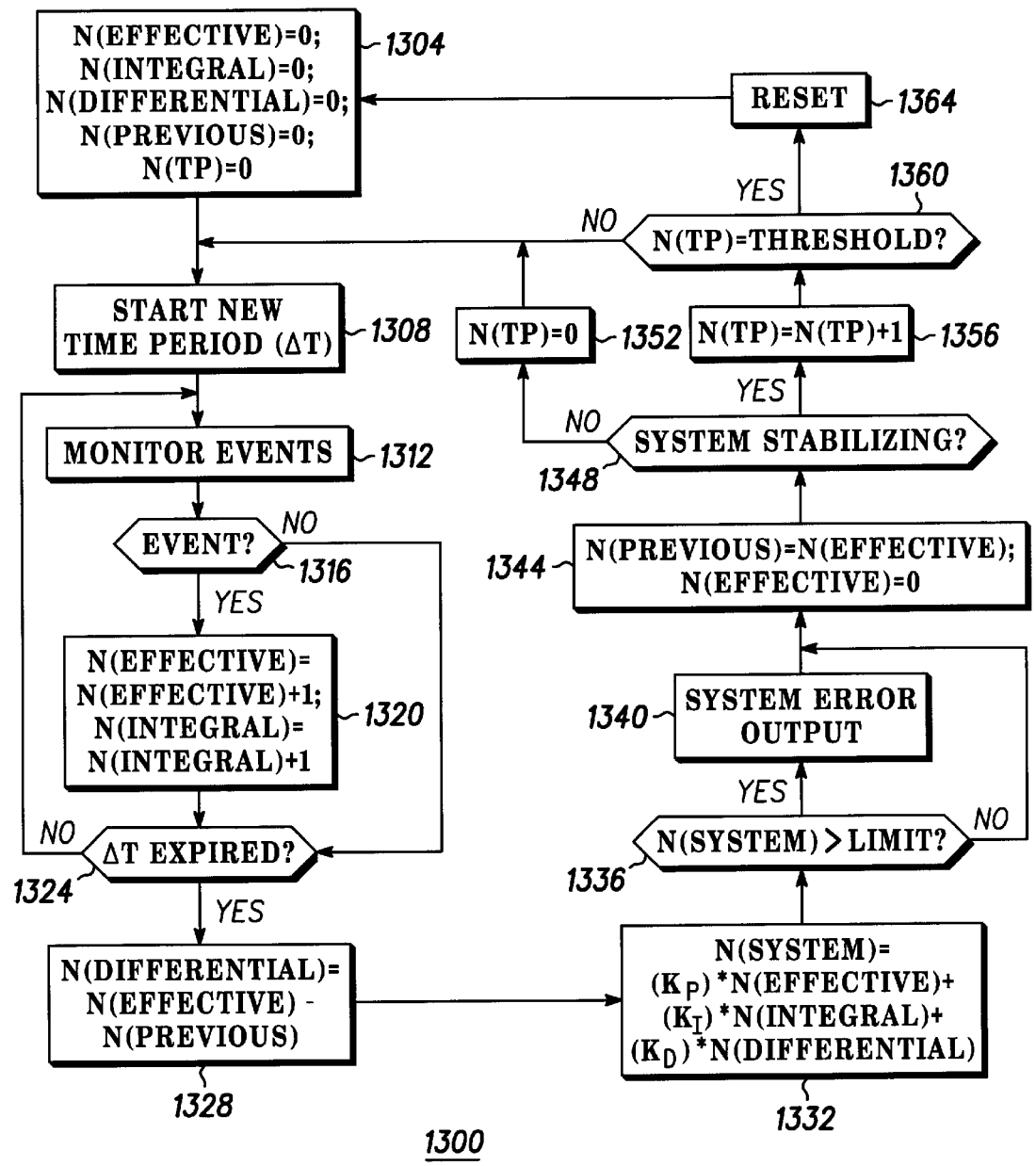

FIG. 13 illustrates an error monitoring process 1300 according to an eleventh embodiment of the present invention. The process starts at step 1304 and a value of zero is initially assigned to each of the variables N(EFFECTIVE), N(INTEGRAL), N(PREVIOUS), N(DIFFERENTIAL), and N(TP), as defined above.

In step 1308, when event monitoring is to begin, a new time period is started. Alternately, the time period is started upon detection of the first event. The occurrence of events is monitored in step 1312. If, at step 1316, an event has occurred, N(EFFECTIVE) and N(INTEGRAL) are incremented at step 1320 and the process proceeds to step 1324. If an event has not occurred at step 1316, the process proceeds directly to step 1324.

If the time period has not expired at step 1324, the process returns to step 1312. If the time period has expired at step 1324, the process proceeds to step 1328.

At the end of the time period, in step 1328, a value for N(DIFFERENTIAL) is calculated by subtracting N(PREVIOUS) from N(EFFECTIVE) and at step 1332, N(SYSTEM) is calculated according to Eq. (1).

At step 1336, it is determined whether N(SYSTEM) exceeds some the system limit threshold. If N(SYSTEM) does not exceed the preselected limit, the process proceeds directly to step 1344. If N(SYSTEM) does exceed the preselected threshold, a system error warning or code, as described above, is generated in step 1340, as described above, before proceeding to step 1344. Optionally, the process ends after the error output of step 1340.

In step 1344, N(PREVIOUS) is assigned the value of N(EFFECTIVE) and then the value for N(EFFECTIVE) is set to zero. The process then continues to step 1348 and it is determined whether there is an indication that the system is stabilizing, as described above. If the system does appear to be stabilizing, the value for N(TP) is incremented at step 1356 to provide a counter for the number of time periods in which the system appears to be stabilizing before proceeding to step 1360. If the one or more selected indicia of stability do not appear at step 1348, N(TP) is reset to zero at step 1352 before returning to step 1308.

If N(TP) has not reached some preselected, preferably user selectable, threshold at step 1360, the process returns to step 1308. If N(TP) has reached the threshold at step 1360, an indication of system stability is output in step 1364, as described above. The process returns to step 1304, N(EFFECTIVE), N(INTEGRAL), N(DIFFERENTIAL), N(PREVIOUS), and N(TP) are reset, and the process repeats. Optionally, the process ends at step 1364.

Figure 14:
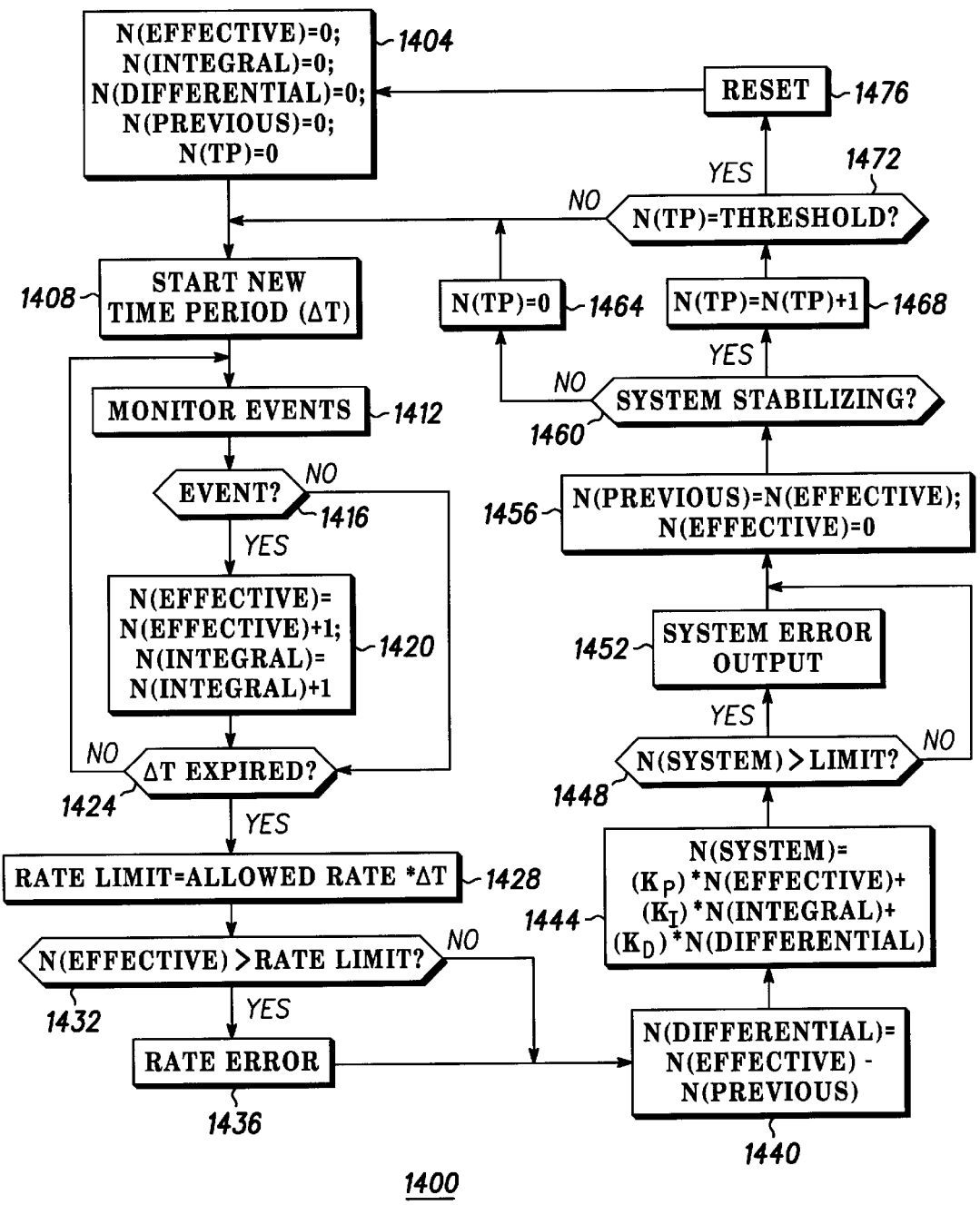

FIG. 14 illustrates an error monitoring process 1400 according to a twelfth embodiment of the present invention. The process starts at step 1404 and a value of zero is initially assigned to each of the variables N(EFFECTIVE), N(INTEGRAL), N(PREVIOUS), N(DIFFERENTIAL), and N(TP), as defined above.

In step 1408, a new time period is started, and events are monitored for in step 1412. If an event is not detected at step 1416, the process proceeds directly to step 1424. If an event monitored for is detected in step 1416, the process proceeds first to step 1420 and N(EFFECTIVE) and N(INTEGRAL) are incremented before proceeding to step 1424.

If the time period has not expired at step 1424, the process returns to step 1412. If the time period has expired at step 1424, the process proceeds to step 1428.

At the end of the time period, in step 1428, the rate limit is assigned or calculated as described above and at step 1432, it is determined if N(EFFECTIVE) exceeds the rate limit threshold. Alternately, other methods of calculating the rate are also contemplated. If the rate limit is exceeded at step 1432, a rate error is generated in step 1436 before proceeding to step 1440. If the rate limit is not exceeded at step 1432, the process proceeds directly to step 1440. Optionally, the process ends with the error output of step 1436.

At step 1440, a value for N(DIFFERENTIAL) is calculated by subtracting N(PREVIOUS) from N(EFFECTIVE), and at step 1444, N(SYSTEM) is calculated according to Eq. (1). At step 1448, it is determined whether N(SYSTEM) exceeds some preselected value. If N(SYSTEM) does not exceed the preselected limit, the process proceeds directly to step 1456. If N(SYSTEM) does exceed the preselected threshold, a system error warning or code, as described above, is generated in step 1452 before proceeding to step 1456. Optionally, the process can end with the error output of step 1452.

Again, the manner of the rate error output of step 1436 and the system error output of step 1452 are preferably distinguishable so as to provide the user with more information about the nature of the error condition. The user is then more informed in determining why the error condition occurred and what action to take.

In step 1456, N(PREVIOUS) is assigned the value of N(EFFECTIVE) and the value for N(EFFECTIVE) is then set to zero. The process then proceeds to step 1460.

The process then continues to step 1460 and it is determined whether there is an indication that the system is stabilizing, as described above. If the system does appear to be stabilizing, the value for N(TP) is incremented at step 1468 before proceeding to step 1472. If the one or more selected indicia of stability do not appear at step 1460, N(TP) is reset to zero at step 1464 before returning to step 1408.

If the threshold value for N(TP) has not been reached at step 1472, the process returns to step 1408. If the threshold value for N(TP) has been reached at step 1472, an indication of system stability is output in step 1476. The process returns to step 1404, N(EFFECTIVE), N(INTEGRAL), N(DIFFERENTIAL), N(PREVIOUS), and N(TP) are reset, and the process repeats. Optionally, the process ends at step 1476.

Figure 15:
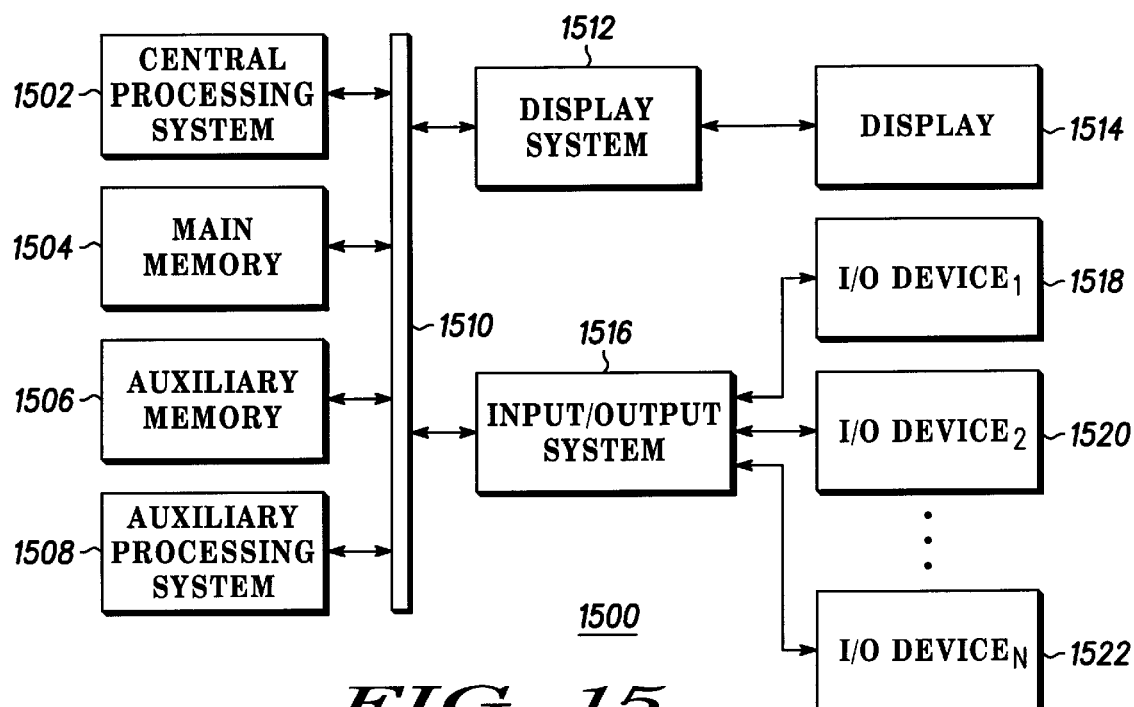
FIG. 15 is a block diagram illustrating an exemplary hardware system operable to employ the present invention.

Referring now to FIG. 15, an exemplary information handling system operable to embody the present invention is shown. The hardware system 1500 shown in FIG. 15 is generally representative of the hardware architecture of a computer-based information handling system of the present invention. The hardware system 1500 is controlled by a central processing system 1502. The central processing system 1502 includes a central processing unit such as a microprocessor or microcontroller for executing programs, performing data manipulations and controlling the tasks of the hardware system 1500. Communication with the central processor 1502 is implemented through a system bus 1510 for transferring information among the components of the hardware system 1500. The bus 1510 may include a data channel for facilitating information transfer between storage and other peripheral components of the hardware system. The bus 1510 further provides the set of signals required for communication with the central processing system 1502 including a data bus, address bus, and control bus. The bus 1510 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 1500 include main memory 1504, and auxiliary memory 1506. The hardware system 1500 may further include an auxiliary processing system 1508 as required. The main memory 1504 provides storage of instructions and data for programs executing on the central processing system 1502. The main memory 1504 is typically semiconductor-based memory such as dynamic random access memory (DRAM) and/or static random access memory (SRAM). Other semiconductor-based memory types include, for example, synchronous dynamic random access memory (SDRAM), double data rate (DDR) SDRAM, Rambus dynamic random access memory (RDRAM), ferroelectric random access memory (FRAM), and so on. The auxiliary memory 1506 provides storage of instructions and data that are loaded into the main memory 1504 before execution. The auxiliary memory 1506 may include semiconductor based memory such as read-only memory (ROM), programmable read-only memory (PROM), erasable programmable read-only memory (EPROM), electrically erasable programmable read-only memory (EEPROM), or flash memory (block-oriented memory similar to EEPROM). The auxiliary memory 1506 may also include a variety of nonsemiconductor-based memories, including, but not limited to, magnetic tape, drum, floppy disk, hard disk, optical laser disk, compact disc read-only memory (CD-ROM), recordable/rewritable compact disc (CD-R, CD-RW), digital versatile disc read-only memory (DVD-ROM), write once DVD (DVD-R), rewritable digital versatile disc (DVD-RAM), etc. Other varieties of memory devices are contemplated as well. The hardware system 1500 may optionally include an auxiliary processing system 1508 which may include one or more auxiliary processors to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor 1502.

The hardware system 1500 further includes a display system 1512 for connecting to a display device 1514, and an input/output (I/O) system 1516 for connecting to one or more I/O devices 1518, 1520, up to N number of I/O devices 1522. The display system 1512 may comprise a video display adapter having all of the components for driving the display device, including video memory, buffer, and graphics engine as desired. Video memory may be, for example, video random access memory (VRAM), synchronous graphics random access memory (SGRAM), SDRAM, windows random access memory (WRAM), and the like.

The display device 1514 may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high gain emissive display (HGED), and so forth.

The input/output system 1516 may comprise one or more controllers or adapters for providing interface functions between the one or more I/O devices 1518–1522. For example, the input/output system 1516 may comprise a serial port, parallel port, integrated device electronics (IDE) interfaces including AT attachment (ATA) IDE, enhanced IDE (EIDE), and the like, small computer system interface (SCSI) including SCSI-1, SCSI-2, SCSI-3, ultra SCSI, fiber channel SCSI, and the like, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, track ball, touch pad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 1516 and I/O devices 1518–1522 may provide or receive analog or digital signals for communication between the hardware system 1500 of the present invention and external devices, networks, or information sources. The input/output system 1516 and I/O devices 1518–1522 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), X.25, frame relay, asynchronous transfer mode (ATM), integrated digital services network (ISDN), synchronous optical network (SONET), synchronous transport signal-1 (STS-1), STS-3, STS-3c, and so forth), synchronous digital hierarchy (SDH), T-carrier channel (T1, T2, T3, etc., digital service level 0 (DS0), DS1, DS1C, DS2, DS3, and so forth), E-carrier channel(E1, E2, E3, E4, and so forth), extended superframe (ESF), personal communications services (PCS), transmission control protocol/Internet protocol (TCP/IP), serial line Internet protocol/point to point protocol (SLIP/PPP), and so on. It is appreciated that modification or reconfiguration of the hardware system 1500 of FIG. 15 by one having ordinary skill in the art would not depart from the scope or the spirit of the present invention.

Figure 16:
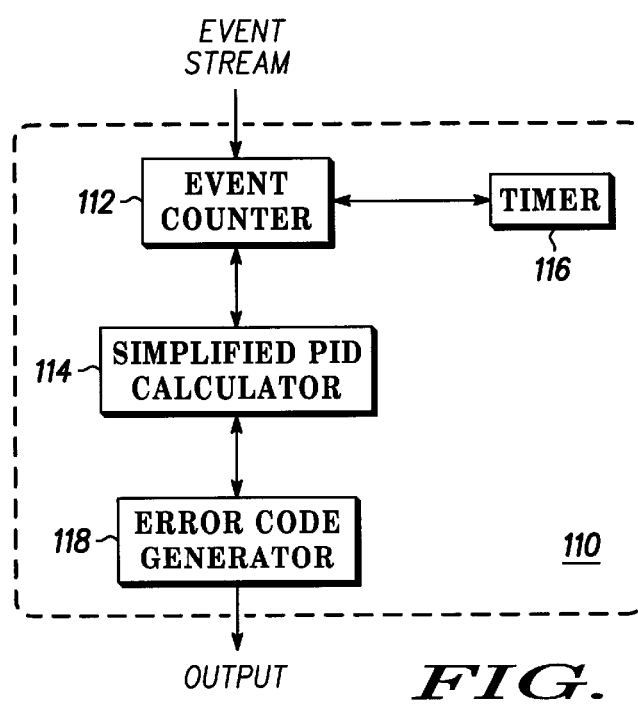
FIG. 16 is a module diagram showing the major data elements and procedure blocks of an event monitor according to an exemplary embodiment of the present invention.

FIG. 16. depicts a module diagram showing the major data elements and procedure blocks of event monitor 110 in accordance with an exemplary embodiment of the present invention. Event monitor 110 includes the various modules 112–118 of an exemplary implementation of the event monitor system. Again, the event monitor 110 can advantageously be implemented in software, hardware, firmware, or any combination thereof.

An event counter 112, such as an accumulator, receives signals indicating the occurrence of a monitored event. The signal is received from one or more event detection circuits or sensors, such as circuitry or logic that monitors data signals for the occurrence of one or more preselected events based on some criteria, monitored signal levels, values of internal queues of a device or devices being monitored, conventional I/O values, e.g., at an I/O pin of the device or devices being monitored, and so forth. In one embodiment, the events are detected by a network analyzer, e.g., implemented software, firmware, hardware, or any combination thereof, of a type for monitoring traffic on a network and/or reading data transmitted over a network. Such network analyzers are generally known in the art.

The event counter 112 increments the event count in response to received signals indicating the occurrence of a monitored event. A simplified PID calculator 114 and an associated memory are provided for calculating the N(DIFFERENTIAL), N(INTEGRAL), N(SYSTEM), N(EFFECTIVE), N(PREVIOUS), allowable rate, N(TP) (system stability), and system limit/threshold, in accordance with this teaching. A timer 116 is provided in conjunction with the event counter 112 for monitoring events for predetermined, preferably user selectable, time periods and starting the calculation routines to recalculate the values at desired intervals. The length of the time period may range, for example, from being on the order of milliseconds or shorter, up to the order of seconds, hours or longer, depending on the type and frequency of the event monitored, as described above. The simplified PID calculator 114 also compares the calculated values to the various preselected threshold values to determine whether an error code should be output and/or withdrawn. An error code generator 118 generates output to inform a user of an error condition, for example, by logging the occurrence of an error condition in a memory, outputting an indication or message to a display, and so forth, or otherwise taking corrective action, and optionally generates a system stable code or message and/or withdraws a previously generated error message upon an indication of system stability.

Thus, it can be seen that the present invention, as exemplified by the embodiments described in FIGS. 3–14, provides the essence of a PID controller in a simplified scheme that uses only multiplication, addition, and subtraction, or, in some cases, only addition and subtraction. In this manner, trend and history information are incorporated into the decision to issue or remove an error warning as the error events are monitored, rather than storing error event rate data for later statistical analysis.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 1504 of one or more computer systems configured generally as described in FIG. 15. Until required by the computer system, the set of instructions may be stored in another computer readable memory such as the auxiliary memory of FIG. 15, for example in a hard disk drive or in a removable memory such as an optical disk for utilization in a DVD-ROM or CD-ROM drive, a magnetic media for utilization in a magnetic media drive, a magneto-optical disk for utilization in a magneto-optical drive, a floptical disk for utilization in a floptical drive, or a memory card for utilization in a card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically, or holographically so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. An event monitor comprising:
   an event counter for counting occurrences of one or more preselected types of events;
   a timer coupled to the event counter for determining the beginning and ending a plurality of time periods to be monitored, each of the time periods having a preselected length of time; and
   processing logic coupled to the timer and the event monitor for calculating:
      a first value equal to or proportional to a total number of events counted in a current time period;
      a second value equal to or proportional to a total number of events counted in all time periods monitored;
      a third value equal to or proportional to the difference between a total number of events counted in a current time period and a total number of events counted in a previous time period; and
      a numerical indicium of system stability, the indicium equal to a sum of said first, second, and third values.

2. The event monitor of claim 1, wherein the events are indicative of an error condition in a data communication system.

3. The event monitor of claim 1, further comprising a sensor generating an event stream coupled to the event counter.

4. The event monitor of claim 1, further including an error code generator for comparing the indicium of system stability with a preselected value and outputting a warning when the indicium of system stability exceeds said preselected value.

5. An event monitor of claim 1, further comprising a user interface for outputting the warning.

6. An event monitor of claim 5, wherein the user interface comprises a human-viewable display.

7. The event monitor of claim 5, wherein the warning includes a value of the indicium of system stability.

8. The event monitor of claim 7, further including an error code generator for comparing the rate of event occurrence with a preselected threshold value and outputting a warning when said rate of event occurrence exceeds the preselected value.

9. The event monitor of claim 1, said processing circuitry further calculating a rate of event occurrence for the current time period.

10. The event monitor of claim 1, wherein the one or more preselected events are selected from device errors, parity errors, network protocol violations, bus protocol violations, network arbitration errors, bus arbitration errors, data corruption, traffic overload, data routing errors, and network flow control errors.

11. The event monitor of claim 1, wherein the numerical indicium is an equally weighted sum of said first, second, and third values.

12. The event monitor of claim 1, wherein the numerical indicium is a weighted sum of said first, second, and third values.

13. The event monitor of claim 12, wherein the weighted sum is calculated using weighting factors input by a user.

14. The event monitor of claim 1, further comprising and error warning generator for outputting an error warning when said indicium of system stability exceeds a preselected value.

15. The event monitor of claim 14, wherein the error warning includes a numerical value of said indicium.

16. The event monitor of claim 1, the processing logic further:
   calculating a rate of event occurrence for the current time period;
   determining whether the rate exceeds a preselected rate threshold value; and
   if the rate exceeds the preselected rate threshold value, outputting an error warning.

17. The event monitor of claim 16, the processing logic further:
   for each time period, determining if the numerical indicium of system stability is the same as the numerical indicium of system stability calculated in an immediately preceding time period; and
   counting a number of consecutive time periods in which the numerical indicium of system stability is the same as the numerical indicium of system stability calculated in an immediately preceding time period.

18. The event monitor of claim 17, the processing logic further:
   determining whether said number of consecutive time periods is greater than or equal to a preselected threshold value; and if the number of consecutive time periods exceeds the preselected threshold value, outputting an indication of system stability.

19. The event monitor of claim 18, wherein outputting an indication of system stability comprises withdrawing a previous error warning.

20. The event monitor of claim 16, the processing logic further:
   for each time period, determining if a total number of events counted in a current time period is less than or equal to a total number of events counted in an immediately preceding time period; and
   counting a number of consecutive time periods in which the total number of events counted in the current time period is less than or equal to the total number of events counted in the immediately preceding time period.

21. The event monitor of claim 20, the processing logic further:
   determining whether said number of consecutive time periods is greater than or equal to a preselected threshold value; and
   if the number of consecutive time periods exceeds the preselected threshold value, outputting an indication of system stability.

22. The event monitor of claim 21, wherein outputting an indication of system stability comprises withdrawing a previous error warning.

23. The event monitor of claim 1, the processing logic further:
   determining whether said number of consecutive time periods is greater than or equal to a preselected threshold value; and
   if the number of consecutive time periods exceeds the preselected threshold value, outputting an indication of system stability.

24. The event monitor of claim 23, the processing logic further:
   determining whether said number of consecutive time periods is greater than or equal to a preselected threshold value; and
   if the number of consecutive time periods exceeds the preselected threshold value, outputting an indication of system stability.

25. The event monitor of claim 24, wherein outputting an indication of system stability comprises withdrawing a previous error warning.

26. The event monitor of claim 1, the processing logic further:
   for each time period, determining if a total number of events counted in a current time period is less than or equal to a total number of events counted in an immediately preceding time period; and
   counting a number of consecutive time periods in which the total number of events counted in the current time period is less than or equal to the total number of events counted in the immediately preceding time period.

27. The event monitor of claim 26, the processing logic further:
   determining whether said number of consecutive time periods is greater than or equal to a preselected threshold value; and
   if the number of consecutive time periods exceeds the preselected threshold value, outputting an indication of system stability.

28. The event monitor of claim 27, wherein outputting an indication of system stability comprises withdrawing a previous error warning.

29. The event monitor of claim 1, further comprising one or more additional like event monitors cascaded such that an output of each monitor is coupled to the event counter of another.

30. A computer-implemented method for monitoring an event stream, comprising:
   counting the occurrence of one or more preselected events for a plurality of successive time periods; and
   calculating a numerical indicium of system stability, the indicium of system stability comprising a sum of:
      a first value equal to or proportional to a total number of events counted in a current time period;
      a second value equal to or proportional to a total number of events counted in all time periods monitored; and
      a third value equal to or proportional to the difference between a total number of events counted in a current time period and a total number of events counted in a previous time period.

31. The method of claim 30, wherein said first, second, and third values are calculated at the end of each time period.

32. The method of claim 30, wherein said first, second, and third values are calculated each time an event is counted.

33. The method of claim 30, wherein at least one of said first, second, and third values are calculated each time an event is counted and wherein at least one of said first, second, and third values are calculated at the end of each time period.

34. The method of claim 30, wherein the event stream is generated by a sensor.

35. The method of claim 30, wherein the event stream is generated within a data communication system.

36. The method of claim 30, further comprising:
   determining whether said indicium of system stability exceeds a preselected value; and
   if said indicium of system stability exceeds the preselected value, outputting an error warning.

37. The method of claim 36, wherein the step of outputting an error warning includes outputting a numerical value of said indicium.

38. The method of claim 36, further comprising:
   if said indicium of system stability exceeds the preselected value, initiating corrective action in response to an error warning.

39. The method of claim 38, wherein the corrective action includes shutting down one or more components of the data communication link.

40. The method of claim 30, further including
   calculating a rate of event occurrence for the current time period;
   determining whether the rate exceeds a preselected rate threshold value; and
   if the rate exceeds the preselected rate threshold value, outputting an error warning.

41. The method of claim 40, further comprising:
   for each time period, determining if the numerical indicium of system stability is the same as the numerical indicium of system stability calculated in an immediately preceding time period; and
   counting a number of consecutive time periods in which the numerical indicium of system stability is the same as the numerical indicium of system stability calculated in an immediately preceding time period.

42. The method of claim 41, further comprising:
   determining whether said number of consecutive time periods is greater than or equal to a preselected threshold value; and if the number of consecutive time periods exceeds the preselected threshold value, outputting an indication of system stability.

43. The method of claim 30, further comprising:

for each time period, determining if the numerical indicium of system stability is the same as the numerical indicium of system stability calculated in an immediately preceding time period; and counting a number of consecutive time periods in which the numerical indicium of system stability is the same as the numerical indicium of system stability calculated in an immediately preceding time period.

44. The method of claim 43, further comprising:

determining whether said number of consecutive time periods is greater than or equal to a preselected threshold value; and if the number of consecutive time periods exceeds the preselected threshold value, outputting an indication of system stability.

45. The method of claim 44, wherein outputting an indication of system stability comprises withdrawing a previous error warning.

46. The method of claim 30, wherein the one or more preselected events are selected from device errors, parity errors, network protocol violations, bus protocol violations, network arbitration errors, bus arbitration errors, data corruption, traffic overload, data routing errors, and network flow control errors.

47. The method of claim 30, wherein the numerical indicium is an equally weighted sum of said first, second, and third values.

48. The method of claim 30, wherein the numerical indicium is a weighted sum of said first, second, and third values.

49. The method of claim 30, wherein the weighted sum is calculated using weighting factors input by a user.

50. An information handling system comprising:

a processor for executing a program of instructions on the information handling system;

a memory coupled to the processor for storing the program of instructions executable by the processor;

a data communication system coupled to the processor; and an event monitor, wherein the program of instructions configures the information handling system to count the occurrence of one or more preselected events for a plurality of successive time periods and to calculate a numerical indicium of system stability, the indicium of system stability comprising a sum of:

a first value equal to or proportional to a total number of events counted in a current time period;

a second value equal to or proportional to a total number of events counted in all time periods monitored; and a third value equal to or proportional to the difference between a total number of events counted in a current time period and a total number of events counted in a previous time period.

51. The information handling system of claim 50, comprising an embedded computer system containing said program of instructions.

52. A network management system for controlling communications over a network, the network management system comprising an event monitor an event monitor for detecting an error condition on the network, comprising:

a sensor coupled to a network component for detecting the occurrence of one or more preselected events;

an event counter coupled to the sensor for counting the number of events detected by the sensor;

a timer coupled to the event counter for determining the beginning and ending a plurality of time periods to be monitored, each of the time periods having a preselected length of time; and processing logic coupled to the timer for calculating a numerical indicium of system stability, said indicium of system stability comprising a sum of:

a first value equal to or proportional to a total number of events counted in a current time period;

a second value equal to or proportional to a total number of events counted in all time periods monitored; and a third value equal to or proportional to the difference between a total number of events counted in a current time period and a total number of events counted in a previous time period.

53. The network management system of claim 52, which is compatible with a promulgated network management protocol.

54. The network management system of claim 52, which is compatible with a Simple Network Management Protocol (SNMP) network management protocol.

55. The network management system of claim 52, wherein the network is a cellular communication system.

56. A computer readable medium having contents for causing a computer-based information handling system to perform steps for detecting an error condition in a data communication system, the steps comprising:

counting the occurrence of one or more preselected events for a plurality of successive time periods; and calculating a numerical indicium of system stability, the indicium of system stability comprising a sum of:

a first value equal to or proportional to a total number of events counted in a current time period;

a second value equal to or proportional to a total number of events counted in all time periods monitored; and a third value equal to or proportional to the difference between a total number of events counted in a current time period and a total number of events counted in a previous time period.

* * * * *